(12) United States Patent
Guo

(10) Patent No.: US 10,680,829 B2
(45) Date of Patent: Jun. 9, 2020

(54) DIRECTIONAL-TRAFFIC STATISTICS METHOD, DEVICE, AND SYSTEM

(71) Applicant: Huawei Technologies Co., Ltd., Shenzhen, Guangdong (CN)

(72) Inventor: Jiancheng Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 15/598,672

(22) Filed: May 18, 2017

(65) Prior Publication Data

US 2017/0257220 A1 Sep. 7, 2017

Related U.S. Application Data

(63) Continuation of application No. PCT/CN2014/091525, filed on Nov. 19, 2014.

(51) Int. Cl.
| | |
|---|---|
| *H04L 9/32* | (2006.01) |
| *H04L 12/14* | (2006.01) |
| *H04L 12/26* | (2006.01) |
| *H04L 29/06* | (2006.01) |

(52) U.S. Cl.
CPC .......... *H04L 9/3263* (2013.01); *H04L 12/14* (2013.01); *H04L 12/1435* (2013.01); *H04L 43/00* (2013.01); *H04L 63/0428* (2013.01)

(58) Field of Classification Search
CPC ............... H04L 9/3263; H04L 63/0428; H04L 12/1435; H04L 43/00; H04L 12/14
USPC ........................................................ 713/156
See application file for complete search history.

(56) References Cited

U.S. PATENT DOCUMENTS

| | | | | |
|---|---|---|---|---|
| 7,353,541 | B1* | 4/2008 | Ishibashi | G06F 21/10 348/E7.056 |
| 2002/0099848 | A1* | 7/2002 | Lee | G06Q 30/04 709/241 |
| 2002/0108042 | A1* | 8/2002 | Oka | H04L 9/14 713/175 |
| 2002/0165807 | A1* | 11/2002 | Tadano | G06Q 20/145 705/32 |
| 2003/0129962 | A1* | 7/2003 | Chaney | H04L 12/14 455/406 |

(Continued)

FOREIGN PATENT DOCUMENTS

| | | |
|---|---|---|
| CN | 101945368 A | 1/2011 |
| CN | 101980500 A | 2/2011 |

(Continued)

*Primary Examiner* — Aravind K Moorthy
(74) *Attorney, Agent, or Firm* — Slater Matsil, LLP

(57) ABSTRACT

The present disclosure provides a directional-traffic statistics collection method, device, and system. A service packet of user equipment is parsed, and whether a feature field in the service packet is valid is determined, to determine whether to report, to a charging server that is configured to perform directional-traffic-based charging on a service provider, an amount of traffic used in a process in which the user equipment uses a service provided by the service provider. According to the solutions in embodiments of the present disclosure, a fraud risk such as fraudulently using a packet feature can be avoided, and accuracy of performing directional-traffic statistics collection on a service provider can be improved.

19 Claims, 8 Drawing Sheets

(56) References Cited

U.S. PATENT DOCUMENTS

| | | | |
|---|---|---|---|
| 2003/0217165 A1* | 11/2003 | Buch | H04L 29/06027 709/229 |
| 2004/0255025 A1* | 12/2004 | Ricagni | H04L 12/14 709/224 |
| 2006/0168451 A1* | 7/2006 | Ishibashi | G06F 21/10 713/176 |
| 2008/0010379 A1* | 1/2008 | Zhao | G06Q 20/123 709/226 |
| 2008/0010452 A1* | 1/2008 | Holtzman | H04L 9/3228 713/158 |
| 2008/0084995 A1* | 4/2008 | Rodgers | H04L 9/0894 380/28 |
| 2008/0159299 A1* | 7/2008 | Bu | H04L 63/10 370/400 |
| 2009/0327812 A1* | 12/2009 | Zhang | H04L 63/0823 714/32 |
| 2010/0138652 A1* | 6/2010 | Sela | G06F 21/445 713/158 |
| 2010/0188975 A1* | 7/2010 | Raleigh | H04M 15/88 370/230.1 |
| 2010/0195503 A1* | 8/2010 | Raleigh | H04L 41/0806 370/235 |
| 2010/0242092 A1 | 9/2010 | Harris et al. | |
| 2011/0207432 A1* | 8/2011 | Wu | H04L 12/14 455/406 |
| 2011/0314145 A1* | 12/2011 | Raleigh | H04L 41/0893 709/224 |
| 2012/0109800 A1 | 5/2012 | Zhou et al. | |
| 2012/0173610 A1* | 7/2012 | Bleau | H04L 67/26 709/203 |
| 2012/0246325 A1* | 9/2012 | Pancorbo Marcos | H04L 63/102 709/227 |
| 2012/0302205 A1* | 11/2012 | Breitbach | H04L 12/1435 455/406 |
| 2013/0144954 A1* | 6/2013 | Li | H04L 67/28 709/205 |
| 2013/0159706 A1* | 6/2013 | Li | H04L 9/321 713/156 |
| 2013/0246813 A1* | 9/2013 | Mori | G06F 17/30289 713/193 |
| 2014/0075567 A1* | 3/2014 | Raleigh | H04W 12/10 726/26 |
| 2014/0230042 A1* | 8/2014 | Moore | H04L 63/02 726/12 |
| 2014/0248852 A1* | 9/2014 | Raleigh | H04M 15/58 455/407 |
| 2015/0206208 A1 | 7/2015 | Sun et al. | |
| 2015/0223042 A1* | 8/2015 | Li | H04W 4/24 455/406 |
| 2015/0350039 A1* | 12/2015 | Narasimhamurthy | H04L 63/0245 709/224 |
| 2016/0006883 A1* | 1/2016 | Cartmell | H04L 12/1403 455/408 |
| 2016/0065456 A1* | 3/2016 | Muley | H04L 45/38 370/392 |
| 2016/0164691 A1* | 6/2016 | Wang | H04M 15/52 370/259 |

FOREIGN PATENT DOCUMENTS

| | | |
|---|---|---|
| CN | 102946554 A | 2/2013 |
| CN | 103684803 A | 3/2014 |
| WO | 02084947 A2 | 10/2002 |
| WO | 2010019970 A1 | 2/2010 |
| WO | 2013177694 A1 | 12/2013 |
| WO | 2014048218 A1 | 4/2014 |

\* cited by examiner

DIRECTIONAL-TRAFFIC STATISTICS METHOD, DEVICE, AND SYSTEM

CROSS-REFERENCE TO RELATED APPLICATIONS

This application is a continuation of International Application No. PCT/CN2014/091525, filed on Nov. 19, 2014, the disclosure of which is hereby incorporated by reference in its entirety.

TECHNICAL FIELD

The present application relates to the field of communications technologies, and specifically, to a directional-traffic statistics collection method, device, and system.

BACKGROUND

In an existing operating network, there is a manner of performing charging based on directional-traffic statistics collection, that is, a service provider pays a traffic fee generated when user equipment uses this service. In this charging solution, calculation may be performed according to an IP address accessed by the user equipment. For example, a gateway device maintains an IP address list including IP addresses provided by the service provider, and collects, according to the IP address list, statistics about traffic generated when each of the IP addresses is accessed. Alternatively, calculation may be performed according to a URL (Uniform Resource Locator) accessed by the user equipment. A gateway device maintains a URL list including URLs provided by the service provider, and collects, according to the URL list, statistics about traffic generated when each of the URLs is accessed. An IP address of the service provider is distributed by an IP address distribution server, the IP address distribution server is likely to provide a shared IP address for multiple service providers, and the gateway device is likely to collect statistics about traffic generated when the user equipment uses a service of another service provider and report the statistics about traffic to a charging server. Therefore, in the solution of performing charging according to an IP address, a charging misoperation is performed on the service provider. The HTTP protocol needs to be used in URL access. In this case, when the user equipment uses a service of the service provider in another non-HTTP protocol access manner, traffic generated in this access process cannot be counted as traffic of the service provider.

To avoid a charging misoperation or omission of statistics, a method for collecting statistics about directional traffic according to a packet feature is proposed in the prior art. A gateway device analyzes a packet used for accessing the service provider to obtain a packet feature, and uses, as a packet used for accessing the service provider, a packet in which the packet feature is detected. According to this method, the charging misoperation or the omission of statistics can be better avoided. However, when another third-party application cracks and simulates the packet feature to use a service of another service provider, after detecting the packet feature, the gateway device directly counts generated traffic as traffic of the service provider, and reports the traffic to a charging server. To avoid this fraud behavior, once a phenomenon that the packet feature is fraudulently used is found, the service provider needs to change the packet feature, user equipment needs to update a program used by the user equipment, so as to obtain and use a new packet feature, and the gateway device needs to obtain, by means of re-analyzing, the packet feature for use. This solution is very cumbersome, and the user equipment, a network device, and the service provider need to synchronously perform updating. Therefore, implementation costs are high, and it is difficult to ensure accuracy of a directional-traffic statistics collection operation.

SUMMARY

To overcome or reduce at least one of the foregoing technical disadvantages, a first aspect of embodiments of this application provides a node device, including:

an obtaining module, configured to obtain a certificate provided by a certificate issuance server;

a receiving module, configured to receive a first service packet sent by user equipment; where the obtaining module is further configured to obtain a first feature field that is in the first service packet and that is related to a directional-traffic-based charging service;

a judging module, configured to determine, according to the certificate, whether the first feature field is valid; and send a first report prompt message to a report module when determining that the first feature field is valid; and the report module, configured to: after receiving the first report prompt message sent by the judging module, calculate a first amount of traffic used in a process in which the user equipment uses a service provided by the service provider, and report the first amount of traffic to a charging server.

With reference to the first aspect, in a first possible implementation manner, the receiving module is further configured to receive the certificate sent by the certificate issuance server for the directional-traffic-based charging service for which the service provider applies; and the node device further includes:

a storing module, configured to store the certificate.

With reference to the first aspect, in a second possible implementation manner, the judging module includes:

a determining unit, configured to determine that the certificate is a valid certificate;

a decryption unit, configured to decrypt the first feature field according to a key and a decryption algorithm that are provided by the certificate; and a judging unit, configured to: determine whether data obtained by decrypting the first feature field by the decryption unit is consistent with content provided by the certificate and content of the first service packet; and when determining that the data obtained by decrypting the first feature field is consistent with the content provided by the certificate and the content of the first service packet, determine that the first feature field is valid.

With reference to the second possible implementation manner of the first aspect, in a third possible implementation manner, the data obtained by decrypting the first feature field includes a certificate version number, a certificate service name, and a first packet digest;

the judging unit is further configured to determine whether the certificate version number and the certificate service name are consistent with a certificate version number and a certificate service name that are included in the certificate;

the judging unit is further configured to determine whether the first packet digest is consistent with the content of the first service packet; and the judging unit is further configured to: when the node determines that the certificate version number and the certificate service name are consistent with the certificate version number and the certificate service name that are included in the certificate and determines that the first packet digest is consistent with the content of the first service packet, determine that the first feature field is valid.

With reference to the third possible implementation manner of the first aspect, in a fourth possible implementation manner, the receiving module is further configured to receive an algorithm database sent by the certificate issuance server; and the decryption unit is further configured to decrypt the first feature field with reference to the key according to a function that is used for supporting the decryption algorithm and that is provided by the algorithm database.

With reference to the first aspect, in a fifth possible implementation manner, the receiving module is further configured to receive a second service packet sent by a service server;

the obtaining module is further configured to obtain a second feature field that is in the second service packet and that is related to the directional-traffic-based charging service;

the judging module is further configured to: determine, according to the certificate, whether the second feature field is valid; and send a second report prompt message to the report module when determining that the second feature field is valid; and the report module is further configured to: after receiving the second report prompt message, calculate a second amount of traffic used in a process in which the service server supports the user equipment in using the service provided by the service provider, and report the second amount of traffic to the charging server.

According to a second aspect, an embodiment of the present disclosure provides user equipment, including:

an obtaining module, configured to obtain a certificate that is related to a directional-traffic-based charging service for which the service provider applies;

a generation module, configured to generate a feature field based on the certificate; and a sending module, configured to send, to a node, a service packet including the feature field.

With reference to the second aspect, in a first possible implementation manner, the sending module is further configured to send a registration request to a certificate push server; and the user equipment further includes:

a receiving module, configured to receive a registration response sent by the certificate push server, where the registration response carries the certificate, and the certificate is sent and issued by the certificate issuance server for the directional-traffic-based charging service for which the service provider applies.

With reference to the second aspect, in a second possible implementation manner, the generation module includes:

a generation submodule, configured to generate a packet digest based on content of the service packet; and a determining submodule, configured to determine that the certificate is a valid certificate; where the generation submodule is further configured to generate the feature field according to the packet digest and content provided by the certificate.

With reference to the second possible implementation manner of the second aspect, in a third possible implementation manner, the generation submodule includes:

an obtaining unit, configured to obtain a certificate version number and a certificate service name from the certificate; and a generation unit, configured to generate the feature field by encrypting the certificate version number, the certificate service name, and the packet digest according to a key and an encryption algorithm that are provided by the certificate.

With reference to the third possible implementation manner of the second aspect, in a fourth possible implementation manner, the generation unit includes:

an obtaining subunit, configured to obtain an algorithm database, where the algorithm database is obtained from service program data provided by the service provider by using a service server; and an encryption subunit, configured to encrypt the certificate version number, the certificate service name, and the packet digest with reference to the key according to a function that is used for supporting the encryption algorithm and that is provided by the algorithm database, to generate the feature field.

According to a third aspect, an embodiment of the present disclosure provides a service server, and the service server may include:

an obtaining module, configured to obtain a certificate that is related to a directional-traffic-based charging service for which a service provider applies, where the certificate is pushed by a certificate push server;

a generation module, configured to generate a feature field based on the certificate; and a sending module, configured to send, to a node, the service packet including the feature field.

According to a fourth aspect, an embodiment of the present disclosure provides a charging system, including user equipment, a node device, a certificate issuance server, a certificate push server, a service server, and a charging server, where the node device is the node device according to any one of the foregoing first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect;

the user equipment is the user equipment according to any one of the foregoing second aspect, the first possible implementation manner of the second aspect, the second possible implementation manner of the second aspect, the third possible implementation manner of the second aspect, or the fourth possible implementation manner of the second aspect;

the certificate issuance server is configured to: issue a certificate according to a directional-traffic-based charging service for which a service provider applies for the service provider, and send the certificate to the certificate push server and the node device; and send an algorithm database to the node device and the service server;

the certificate push server is configured to: receive the certificate sent by the certificate issuance server; receive a registration request sent by the user equipment; and send, to the user equipment in response to the registration request sent by the user equipment, a registration response carrying the certificate;

when the service server needs to send a service packet to the user equipment, the service server is configured to:

obtain the certificate; generate a feature field based on the certificate; send, to the node device, the service packet including the feature field, so that after verifying that the feature field is valid, the node device calculates an amount of traffic used in a process in which the service server supports the user equipment in using a service provided by the service provider, and reports the amount of traffic to the charging server; receive the certificate pushed by the certificate issuance server; receive the algorithm database; and set the algorithm database into service program data provided by the service provider; and the charging server is configured to: receive an amount, sent by the node device, of traffic used in a process in which the user equipment uses the service provided by the service provider; perform directional-traffic-based charging on the service provider according to the amount of traffic used in the process in which the user equipment uses the service provided by the service provider; receive an amount, sent by the node device, of traffic used in a process in which the service server uses the service provided by the service provider; and perform directional-traffic-based charging on the service provider according to the amount of traffic used in the process in which the service server uses the service provided by the service provider.

According to a fifth aspect, an embodiment of the present disclosure provides a directional-traffic statistics collection method, including:

obtaining, by a node, a certificate provided by a certificate issuance server;

receiving, by the node, a first service packet sent by user equipment, and obtaining a first feature field that is in the first service packet and that is related to a directional-traffic-based charging service;

determining, by the node according to the certificate, whether the first feature field is valid; and if the node determines that the first feature field is valid, calculating, by the node, a first amount of traffic used in a process in which the user equipment uses a service provided by the service provider, and reporting the first amount of traffic to a charging server.

With reference to the fifth aspect, in a first possible implementation manner, before the obtaining, by a node, a certificate provided by a certificate issuance server, the method further includes:

receiving and storing, by the node, the certificate sent by the certificate issuance server for the directional-traffic-based charging service for which the service provider applies.

With reference to the fifth aspect, in a second possible implementation manner, the determining, by the node according to the certificate, whether the first feature field is valid includes:

determining, by the node, that the certificate is a valid certificate;

decrypting, by the node, the first feature field according to a key and a decryption algorithm that are provided by the certificate;

determining, by the node, whether data obtained by decrypting the first feature field is consistent with content provided by the certificate and content of the first service packet; and if determining that the data obtained by decrypting the first feature field is consistent with the content provided by the certificate and the content of the first service packet, determining, by the node, that the first feature field is valid.

With reference to the second possible implementation manner of the fifth aspect, in a third possible implementation manner, the data obtained by decrypting the first feature field includes a certificate version number, a certificate service name, and a first packet digest; and the determining, by the node, whether data obtained by decrypting the first feature field is consistent with content provided by the certificate and content of the first service packet includes:

determining, by the node, whether the certificate version number and the certificate service name are consistent with a certificate version number and a certificate service name that are included in the certificate;

determining, by the node, whether the first packet digest is consistent with the content of the first service packet; and if the node determines that the certificate version number and the certificate service name are consistent with the certificate version number and the certificate service name that are included in the certificate and determines that the first packet digest is consistent with the content of the first service packet, determining, by the node, that the first feature field is valid.

With reference to the second possible implementation manner of the fifth aspect, in a fourth possible implementation manner, before the obtaining, by a node, a certificate provided by a certificate issuance server, the method further includes:

receiving, by the node, an algorithm database sent by the certificate issuance server; and the decrypting, by the node, the first feature field according to a key and a decryption algorithm that are provided by the certificate includes:

decrypting, by the node, the first feature field with reference to the key according to a function that is used for supporting the decryption algorithm and that is provided by the algorithm database.

With reference to the fifth aspect, in a fifth possible implementation manner, after the calculating, by the node, a first amount of traffic used in a process in which the user equipment uses a service provided by the service provider, and reporting the first amount of traffic to a charging server, the method further includes:

receiving, by the node, a second service packet sent by a service server;

obtaining, by the node, a second feature field that is in the second service packet and that is related to the directional-traffic-based charging service;

determining, by the node according to the certificate, whether the second feature field is valid; and if the node determines that the second feature field is valid, calculating, by the node, a second amount of traffic used in a process in which the service server supports the user equipment in using the service provided by the service provider, and reporting the second amount of traffic to the charging server.

According to a sixth aspect, an embodiment of the present disclosure provides a service packet sending method, including:

obtaining, by user equipment, a certificate that is related to a directional-traffic-based charging service for which the service provider applies;

generating, by the user equipment, a feature field based on the certificate; and sending, by the user equipment to a node, a service packet including the feature field.

With reference to the sixth aspect, in a first possible implementation manner, before the obtaining, by user equipment, a certificate that is related to a directional-traffic-based charging service for which the service provider applies, the method further includes:

sending, by the user equipment, a registration request to a certificate push server; and receiving, by the user equipment, a registration response sent by the certificate push server, where the registration response carries the certificate, and the certificate is sent and issued by the certificate issuance server for the directional-traffic-based charging service for which the service provider applies.

With reference to the sixth aspect, in a second possible implementation manner, the generating, by the user equipment, a feature field based on the certificate includes:

generating, by the user equipment, a packet digest based on content of the service packet;

determining, by the user equipment, that the certificate is a valid certificate; and generating, by the user equipment, the feature field according to the packet digest and content provided by the certificate.

With reference to the second possible implementation manner of the sixth aspect, in a third possible implementation manner, the generating, by the user equipment, the feature field according to the packet digest and content provided by the certificate includes:

obtaining, by the user equipment, a certificate version number and a certificate service name from the certificate; and generating, by the user equipment, the feature field by encrypting the certificate version number, the certificate service name, and the packet digest according to a key and an encryption algorithm that are provided by the certificate.

With reference to the third possible implementation manner of the sixth aspect, in a fourth possible implementation manner, the generating, by the user equipment, the feature field by encrypting the certificate version number, the certificate service name, and the packet digest according to a key and an encryption algorithm that are provided by the certificate includes:

obtaining, by the user equipment, an algorithm database, where the algorithm database is obtained from service program data provided by the service provider by using a service server; and encrypting, by the user equipment, the certificate version number, the certificate service name, and the packet digest with reference to the key according to a function that is used for supporting the encryption algorithm and that is provided by the algorithm database, to generate the feature field.

According to a seventh aspect, an embodiment of the present disclosure provides a service packet sending method, and the method may include:

obtaining, by a service server, a certificate that is related to a directional-traffic-based charging service for which a service provider applies, where the certificate is pushed by a certificate push server;

generating, by the service server, a feature field based on the certificate; and sending, by the service server to a node, the service packet including the feature field.

According to an eighth aspect, an embodiment of the present disclosure provides a node device, including an input apparatus, an output apparatus, a memory, and a processor, where the memory stores a group of program code, and the processor is configured to invoke the program code stored in the memory;

the processor is configured to obtain a certificate provided by a certificate issuance server;

the input apparatus is configured to: receive a first service packet sent by user equipment, and obtain a first feature field that is in the first service packet and that is related to a directional-traffic-based charging service;

the processor is further configured to determine, according to the certificate, whether the first feature field is valid; and the processor is further configured to: when determining that the first feature field is valid, calculate a first amount of traffic used in a process in which the user equipment uses a service provided by the service provider, and report the first amount of traffic to a charging server.

With reference to the eighth aspect, in a first possible implementation manner, before the processor performs the step of obtaining a certificate provided by a certificate issuance server, the input apparatus is further configured to receive the certificate sent by the certificate issuance server for the directional-traffic-based charging service for which the service provider applies; and the memory is further configured to store the certificate.

With reference to the eighth aspect, in a second possible implementation manner, that the processor performs the step of determining, according to the certificate, whether the first feature field is valid includes:

determining that the certificate is a valid certificate;

decrypting the first feature field according to a key and a decryption algorithm that are provided by the certificate;

determining whether data obtained by decrypting the first feature field is consistent with content provided by the certificate and content of the first service packet; and if determining that the data obtained by decrypting the first feature field is consistent with the content provided by the certificate and the content of the first service packet, determining that the first feature field is valid.

With reference to the third possible implementation manner of the eighth aspect, in a fourth possible implementation manner, the data obtained by decrypting the first feature field includes a certificate version number, a certificate service name, and a first packet digest; and that the processor performs the step of determining whether data obtained by decrypting the first feature field is consistent with content provided by the certificate and content of the first service packet includes:

determining whether the certificate version number and the certificate service name are consistent with a certificate version number and a certificate service name that are included in the certificate;

determining whether the first packet digest is consistent with the content of the first service packet; and if determining that the certificate version number and the certificate service name are consistent with the certificate version number and the certificate service name that are included in the certificate and determining that the first packet digest is consistent with the content of the first service packet, determining that the first feature field is valid.

With reference to the third possible implementation manner of the eighth aspect, in a fifth possible implementation manner, before the processor performs the step of obtaining a certificate provided by a certificate issuance server, the input apparatus is further configured to receive an algorithm database sent by the certificate issuance server; and that the processor performs the step of decrypting the first feature field according to a key and a decryption algorithm that are provided by the certificate includes:

decrypting the first feature field with reference to the key according to a function that is used for supporting the decryption algorithm and that is provided by the algorithm database.

With reference to the eighth aspect, in a sixth possible implementation manner, after the processor calculates the first amount of traffic used in the process in which the user equipment uses the service provided by the service provider, and reports the first amount of traffic to the charging server, the input apparatus is further configured to receive a second service packet sent by a service server; and the processor is further configured to perform the following operations:

obtaining a second feature field that is in the second service packet and that is related to the directional-traffic-based charging service;

determining, according to the certificate, whether the second feature field is valid; and if determining that the second feature field is valid, calculating a second amount of traffic used in a process in which the service server supports the user equipment in using the service provided by the service provider, and reporting the second amount of traffic to the charging server.

According to a ninth aspect, an embodiment of the present disclosure provides user equipment, including an input apparatus, an output apparatus, a memory, and a processor, where the memory stores a group of program code, and the processor is configured to invoke the program code stored in the memory;

the processor is configured to obtain a certificate that is related to a directional-traffic-based charging service for which the service provider applies;

the processor is further configured to generate a feature field based on the certificate; and the output apparatus is configured to send, to a node, a service packet including the feature field.

With reference to the ninth aspect, in a first possible implementation manner, before the processor performs the step of obtaining a certificate that is related to a directional-traffic-based charging service for which the service provider applies, the output apparatus is further configured to send a registration request to a certificate push server; and the input apparatus is further configured to receive a registration response sent by the certificate push server, where the registration response carries the certificate, and the certificate is sent and issued by the certificate issuance server for the directional-traffic-based charging service for which the service provider applies.

With reference to the ninth aspect, in a second possible implementation manner, that the processor performs the step of generating a feature field based on the certificate includes:

generating a packet digest based on content of the service packet;

determining that the certificate is a valid certificate; and generating the feature field according to the packet digest and content provided by the certificate.

With reference to the second possible implementation manner of the ninth aspect, in a third possible implementation manner, that the processor performs the step of generating the feature field according to the packet digest and content provided by the certificate includes:

obtaining a certificate version number and a certificate service name from the certificate; and generating the feature field by encrypting the certificate version number, the certificate service name, and the packet digest according to a key and an encryption algorithm that are provided by the certificate.

With reference to the third possible implementation manner of the ninth aspect, in a fourth possible implementation manner, that the processor performs the step of generating the feature field by encrypting the certificate version number, the certificate service name, and the packet digest according to a key and an encryption algorithm that are provided by the certificate includes:

obtaining an algorithm database, where the algorithm database is obtained from service program data provided by the service provider by using a service server; and encrypting the certificate version number, the certificate service name, and the packet digest with reference to the key according to a function that is used for supporting the encryption algorithm and that is provided by the algorithm database, to generate the feature field.

According to a tenth aspect, an embodiment of the present disclosure provides a service server, including an input apparatus, an output apparatus, a memory, and a processor, where the memory stores a group of program code, and the processor is configured to invoke the program code stored in the memory, so as to perform the following operations:

obtaining a certificate that is related to a directional-traffic-based charging service for which a service provider applies, where the certificate is pushed by a certificate push server;

generating a feature field based on the certificate; and sending, to a node, the service packet including the feature field.

According to the embodiments of the present disclosure, a service packet of user equipment is parsed, and whether a feature field in the service packet is valid is determined, to determine whether to report, to a charging server that is configured to perform directional-traffic-based charging on the service provider, an amount of traffic used in a process in which the user equipment uses a service provided by the service provider. According to the solutions in the embodiments of the present disclosure, a fraud risk such as fraudulently using a packet feature can be avoided, and accuracy of performing directional-traffic statistics collection on a service provider can be improved.

BRIEF DESCRIPTION OF THE DRAWINGS

To describe technical solutions in embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly describes technical solutions in embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure are applied to a charging system. A service packet of user equipment is parsed, and whether a feature field in the service packet is valid is determined, to determine whether to report, to a charging server that is configured to perform directional-traffic-based charging on the service provider, an amount of traffic used in a process in which the user equipment uses a service provided by the Service Provider (SP), so as to avoid a fraud risk such as fraudulently using a packet feature and improve accuracy of performing directional-traffic statistics collection on a service provider.

Figure 1A:
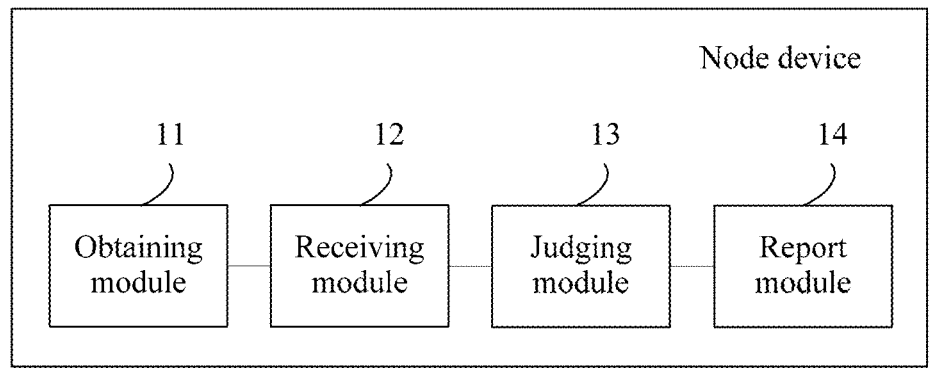
FIG. 1a is a schematic diagram of structural composition of a first node device according to an embodiment of the present disclosure.

Specifically, referring to FIG. 1a, FIG. 1a is a schematic diagram of structural composition of a node device according to an embodiment of the present disclosure. As shown in FIG. 1a, the node device provided in this embodiment of the present disclosure may be configured to implement a directional-traffic statistics collection method. A specific implementation manner is shown in FIG. 1a. The node device provided in this embodiment includes an obtaining module 11, a receiving module 12, a judging module 13, and a report module 14.

The obtaining module 11 is configured to obtain a certificate provided by a certificate issuance server.

The receiving module 12 is configured to receive a first service packet sent by user equipment.

The obtaining module 11 is further configured to obtain a first feature field that is in the first service packet and that is related to a directional-traffic-based charging service.

The judging module 13 is configured to: determine, according to the certificate, whether the first feature field is valid; and send a first report prompt message to the report module 14 when determining that the first feature field is valid.

The report module 14 is configured to: after receiving the first report prompt message sent by the judging module 13, calculate a first amount of traffic used in a process in which the user equipment uses a service provided by a service provider, and report the first amount of traffic to a charging server, so that the charging server performs directional-traffic-based charging on the service provider according to the first amount of traffic.

In this embodiment of the present disclosure, the user equipment may be a device that can implement network access, such as User Equipment (UE), an Mobile Station (MS), a mobile terminal, or a computer. The node device may be a GGSN (Gateway GPRS Support Node), a DPI (Deep Packet Inspection) device, a PDG (Packet Data Gateway), or the like. This is not limited herein. The node device is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

The certificate issuance server mentioned in this embodiment of the present disclosure is an operator. The certificate issuance server is configured to issue the certificate for the directional-traffic-based charging service for which the service provider applies. The certificate issuance server may be a CA (Certificate Authority) server. The certificate issued by the certificate issuance server is a character string in a specific format, and the certificate may include data such as a certificate version number, a certificate service name, a certificate validity period, an encryption/decryption algorithm, and a key.

Further, optionally, the first service packet received by the receiving module 12 may be sent by the user equipment by using an APP (Application) downloaded by the user equipment. The first service packet is supposed to be forwarded by the node device to a service server that is configured to support the service, and may be in a format shown in Table 1:

TABLE 1

| Packet header | First feature field | Packet content |
| --- | --- | --- |

Figure 1B:
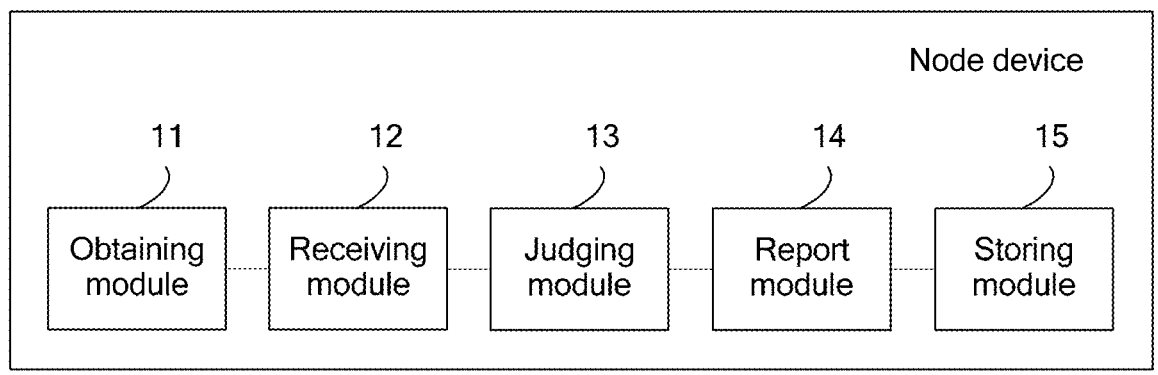
FIG. 1b is a schematic diagram of structural composition of a second node device according to an embodiment of the present disclosure.

The APP may be released by the service server to an application platform. After the service provider applies for the directional-traffic-based charging service and obtains the corresponding certificate by using the certificate issuance server, the certificate issuance server that issues the certificate may send the certificate to the node device, so that the node device checks the first service packet that is used for a service of the APP. Correspondingly, referring to FIG. 1b, the receiving module 12 in this embodiment of the present disclosure is further configured to receive the certificate sent by the certificate issuance server for the directional-traffic-based charging service for which the service provider applies. A storing module 15 in this embodiment of the present disclosure may be configured to store the received certificate.

Figure 1C:
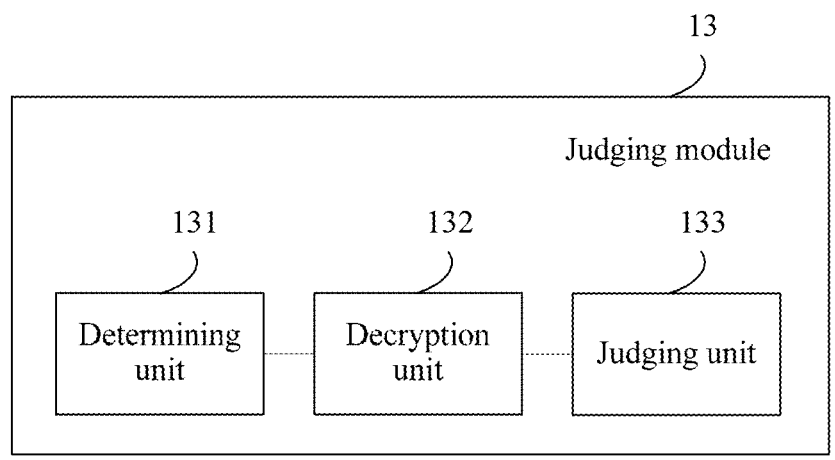
FIG. 1c is a schematic diagram of structural composition of a third node device according to an embodiment of the present disclosure.

In an optional implementation manner, referring to FIG. 1c, the judging module 13 may further determine, according to the certificate by using a determining unit 131, a decryption unit 132, and a judging unit 133, whether the first feature field is valid. The implementation manner is specifically as follows:

The determining unit 131 is configured to determine that the certificate is a valid certificate.

The decryption unit 132 is configured to decrypt the first feature field according to a key and a decryption algorithm that are provided by the certificate.

The judging unit 133 is configured to: determine whether data obtained by decrypting the first feature field by the decryption unit is consistent with content provided by the certificate and content of the first service packet; and when determining that the data obtained by decrypting the first feature field is consistent with the content provided by the certificate and the content of the first service packet, determine that the first feature field is valid.

In an optional implementation manner, the first feature field in the foregoing received first service packet may include encryption information of a certificate version number, encryption information of a certificate service name, and encryption information of a first packet digest. The first service packet is generated by the user equipment according to the certificate issued by the certificate issuance server. Both the certificate version number and the certificate service name that are included in the first feature field are provided by the certificate. A manner of generating the first packet digest is specified by the certificate. In addition, an encryption algorithm and a key that are involved in a process of generating the first feature field by encrypting the certificate version number, the certificate service name, and the first packet digest are provided by the certificate. Therefore, the judging unit 133 may specifically determine, according to the certificate provided by the foregoing certificate issuance server, whether the first feature field is valid.

The judging unit 133 is further configured to determine whether the certificate version number and the certificate service name are consistent with a certificate version number and a certificate service name that are included in the certificate.

The judging unit 133 is further configured to determine whether the first packet digest is consistent with the content of the first service packet.

The judging unit 133 is further configured to: when the node determines that the certificate version number and the certificate service name are consistent with the certificate version number and the certificate service name that are included in the certificate and determines that the first packet digest is consistent with the content of the first service packet, determine that the first feature field is valid.

Specifically, an algorithm for the first packet digest may include a CRC (Cyclic Redundancy Check) algorithm, an MD (Message Digest) algorithm, an SHA (Secure Hash Algorithm), and the like. Correspondingly, the first packet digest may be a CRC code, an MD code, an SHA code, or the like.

Optionally, the receiving module 12 is further configured to receive an algorithm database sent by the certificate issuance server. The algorithm database is used to provide a function for supporting the encryption/decryption algorithm. The node device may find a corresponding calculation function from the algorithm database according to an algorithm specified in the certificate, to decrypt the first feature field. Correspondingly, the decryption unit 132 may be configured to decrypt the first feature field with reference to the key according to a function that is used for supporting the decryption algorithm and that is provided by the algorithm database.

In addition, when determining that a validity period obtained from the certificate expires, the node device does not further determine validity of the first feature field in the first service packet, and may inform the service server that the validity period of the certificate expires. In this case, the service provider needs to renew a subscription to or reapply for the directional-traffic-based charging service, and regain a certificate.

Further, optionally, when the node device determines that the first feature field in the first service packet is invalid, it is considered that the user equipment that sends the first service packet has a fraud behavior, and the node device does not forward the first service packet to the service server and terminates an access behavior of the user equipment; or continues to forward the first service packet to the service server, but reports, to the charging server that is configured to charge the user equipment, the first amount of traffic that is obtained through statistics collection, and instructs the charging server to perform charging by using a charging policy of double punishment.

Further, optionally, the node device in this embodiment of the present disclosure is configured to receive a second service packet from the service server. The second service packet is supposed to be forwarded by the node device to the user equipment, and may be in a format shown in Table 2:

TABLE 2

| Packet header | Second feature field | Packet content |
| --- | --- | --- |

The node device in this embodiment of the present disclosure may determine, according to the second service packet, whether the service server has a fraud behavior.

The receiving module 12 is further configured to receive the second service packet sent by the service server.

The obtaining module 11 is further configured to obtain a second feature field that is in the second service packet and that is related to the directional-traffic-based charging service.

The judging module 13 is further configured to: determine, according to the certificate, whether the second feature field is valid; and send a second report prompt message to the report module when determining that the second feature field is valid.

The report module 14 is further configured to: after receiving the second report prompt message, calculate a second amount of traffic used in a process in which the service server supports the user equipment in using the service provided by the service provider, and report the second amount of traffic to the charging server, so that the charging server performs directional-traffic-based charging on the service provider according to the second amount of traffic.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

After receiving a service packet of user equipment, the node device in this embodiment of the present disclosure determines, by detecting whether a feature field in the service packet is valid, whether to report, to a charging server that is configured to perform directional-traffic-based charging on a service provider, an amount of traffic used in a process in which the user equipment uses a service provided by the service provider. Therefore, a fraud behavior can be effectively avoided. According to the node device in this embodiment of the present disclosure, a fraud risk such as fraudulently using a packet feature is avoided, and accuracy of performing directional-traffic statistics collection on a service provider is improved.

Figure 2A:
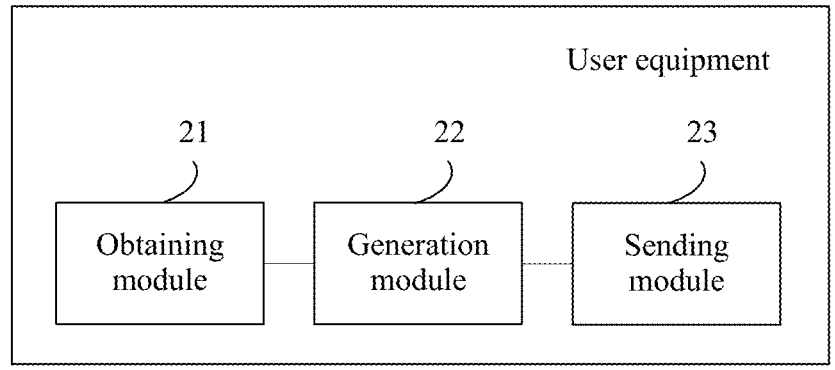
FIG. 2a is a schematic diagram of structural composition of first user equipment according to an embodiment of the present disclosure.

Referring to FIG. 2a, FIG. 2a is a schematic diagram of structural composition of user equipment according to an embodiment of the present disclosure. As shown in FIG. 2a, the user equipment provided in this embodiment of the present disclosure may be configured to implement a packet sending method. A specific implementation manner is shown in FIG. 2a. The user equipment provided in this embodiment includes:

an obtaining module 21, configured to obtain a certificate that is related to a directional-traffic-based charging service for which a service provider applies;

a generation module 22, configured to generate a feature field based on the obtained certificate; and a sending module 23, configured to send, to a node, a service packet including the feature field, so that after verifying that the feature field is valid, the node calculates an amount of traffic used in a process in which the user equipment uses a service provided by the service provider, and reports the amount of traffic to a charging server, and the charging server performs directional-traffic-based charging on the service provider according to the amount of traffic.

In this embodiment of the present disclosure, the user equipment may be a device that can implement network access, such as UE (User Equipment), an MS (Mobile Station), a mobile terminal, or a computer. The node device may be a GGSN (Gateway GPRS Support Node), a DPI (Deep Packet Inspection) device, a PDG (Packet Data Gateway), or the like. This is not limited herein. The node device is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

Figure 2B:
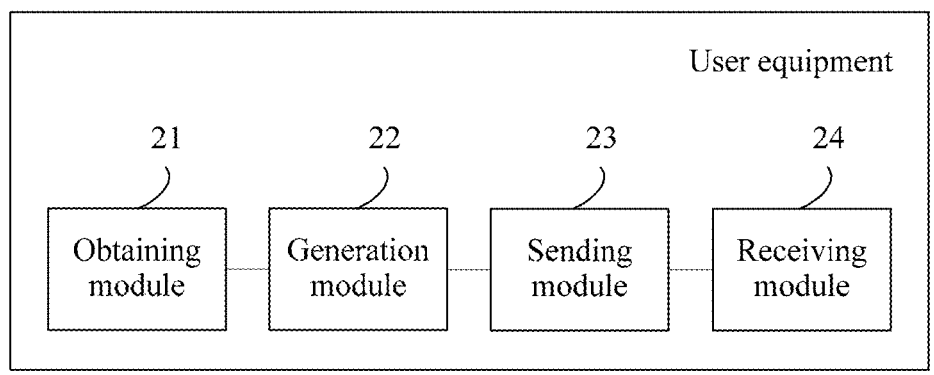
FIG. 2b is a schematic diagram of structural composition of second user equipment according to an embodiment of the present disclosure.

Further, optionally, referring to FIG. 2b, the user equipment in this embodiment of the present disclosure obtains the certificate from a certificate push server.

The sending module 23 is further configured to send a registration request to the certificate push server.

A receiving module 24 is configured to receive a registration response sent by the certificate push server. The registration response carries the certificate, and the certificate is sent and issued by a certificate issuance server for the directional-traffic-based charging service for which the service provider applies.

The certificate issuance server mentioned in this embodiment of the present disclosure is an operator. The certificate issuance server is configured to issue the certificate for the directional-traffic-based charging service for which the service provider applies. The certificate issuance server may be a CA (Certificate Authority) server. The certificate issued by the certificate issuance server is a character string in a specific format, and the certificate may include data such as a certificate version number, a certificate service name, a certificate validity period, an encryption/decryption algorithm, and a key.

Figure 2C:
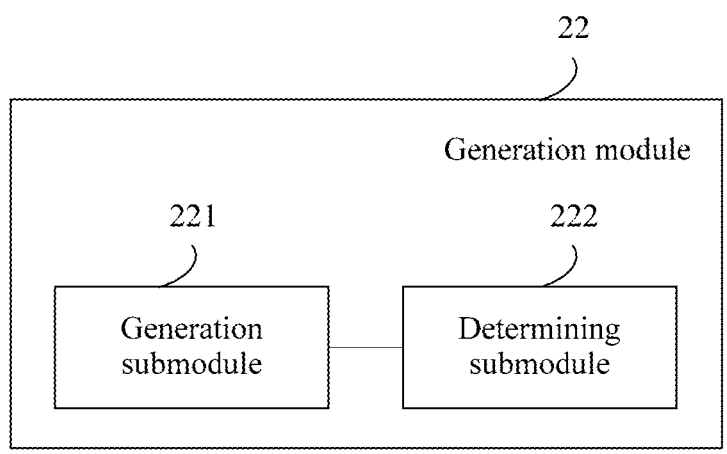
FIG. 2c is a schematic diagram of structural composition of third user equipment according to an embodiment of the present disclosure.

Further, optionally, when generating the service packet by using an APP downloaded by the user equipment, the user equipment in this embodiment of the present disclosure needs to generate the feature field used for verification. The feature field is generated according to the foregoing obtained certificate. Referring to FIG. 2c, the generation module 22 in this embodiment of the present disclosure may further generate the feature field by using a generation submodule 221 and a determining submodule 222.

The generation submodule 221 is configured to generate a packet digest based on content of the service packet.

The determining submodule 222 is configured to determine that the certificate is a valid certificate.

The generation submodule 221 is further configured to generate the feature field according to the packet digest and content provided by the certificate.

Figure 2D:
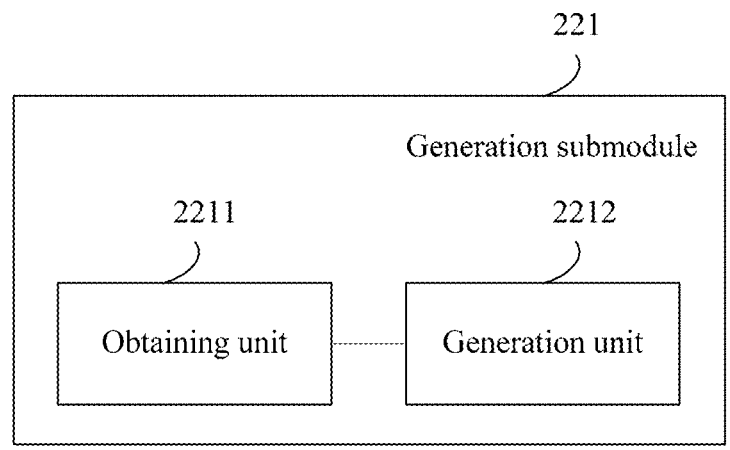
FIG. 2d is a schematic diagram of structural composition of fourth user equipment according to an embodiment of the present disclosure.

Further, optionally, the certificate mentioned in this embodiment of the present disclosure includes a certificate version number and a certificate service name, and provides a key and an encryption algorithm, so as to generate the feature field. Referring to FIG. 2d, the generation submodule 221 in this embodiment of the present disclosure may further include:

an obtaining unit 2211, configured to obtain the certificate version number and the certificate service name from the certificate; and a generation unit 2212, configured to generate the feature field by encrypting the certificate version number, the certificate service name, and the packet digest according to the key and the encryption algorithm that are provided by the certificate.

Specifically, an algorithm for the packet digest may include a CRC (Cyclic Redundancy Check) algorithm, an MD (Message Digest) algorithm, an SHA (Secure Hash Algorithm), and the like. Correspondingly, the packet digest may be a CRC code, an MD code, an SHA code, or the like.

Figure 2E:
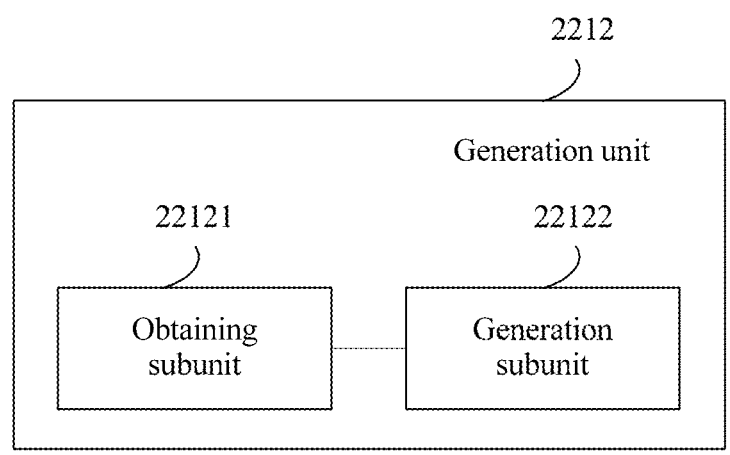
FIG. 2e is a schematic diagram of structural composition of fifth user equipment according to an embodiment of the present disclosure.

Further, optionally, a service server may embed an algorithm database in an APP provided by the service server. Therefore, the user equipment may obtain, from the algorithm database according to the algorithm database provided by the APP and according to the encryption algorithm required in the certificate, an encryption function that needs to be used, to perform encryption calculation. Referring to FIG. 2e, the generation unit 2212 in this embodiment of the present disclosure may further include:

an obtaining subunit 22121, configured to obtain the algorithm database, where the algorithm database is obtained from service program data provided by the service provider by using the service server; and an encryption subunit 22122, configured to encrypt the certificate version number, the certificate service name, and the packet digest with reference to the key according to a function that is used for supporting the encryption algorithm and that is provided by the algorithm database, to generate the feature field.

After generating the feature field, the user equipment may write the feature field into the packet. For a location, refer to Table 1.

In addition, when determining that a validity period obtained from the certificate expires, the user equipment cannot send the service packet by using the certificate, but may report a certificate invalidity message to the service server by using the APP application program, to inform that the validity period of the certificate expires. In this case, the service provider needs to renew a subscription to or reapply for the directional-traffic-based charging service, and regain a certificate.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

In this embodiment of the present disclosure, a specific process in which the user equipment receives the certificate pushed by the certificate push server needs participation of the node device. The certificate push server may send the certificate to the node device, and prompt the node device to forward the certificate to the user equipment.

When the user equipment in this embodiment of the present disclosure needs to use a service provided by a service provider, the user equipment generates a feature field in real time according to content of a certificate and content of a sent packet, and then adds the feature field to a service packet that needs to be sent to a node device, so that after verifying that the feature field is valid, the node device calculates an amount of traffic used in a process in which the user equipment uses the service provided by the service provider, and reports the amount of traffic to a charging server, and the charging server performs directional-traffic-based charging on the service provider according to the amount of traffic. The service packet sent by the user equipment in this embodiment of the present disclosure uses the feature field that is generated based on the certificate. Therefore, an effect of a dynamic packet feature can be achieved, a fraud behavior can be better detected by the node device, the service packet can be better verified by the node device, and accuracy of performing directional-traffic statistics collection on the service provider by the node device is improved.

Figure 3:
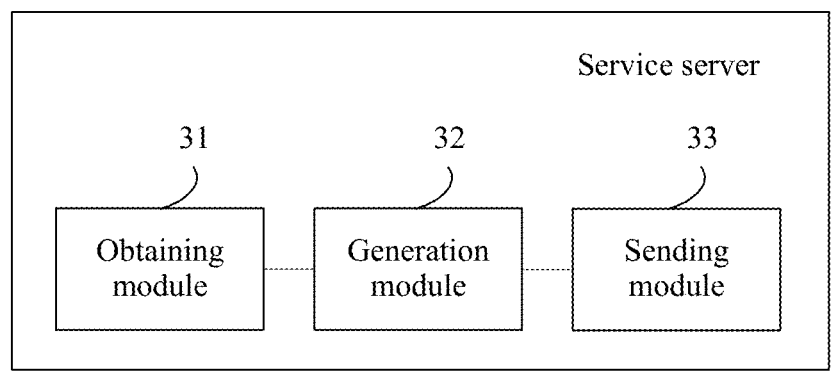
FIG. 3 is a schematic diagram of structural composition of a service server according to an embodiment of the present disclosure.

Referring to FIG. 3, FIG. 3 is a schematic diagram of structural composition of a service server according to an embodiment of the present disclosure. As shown in FIG. 3, the service server provided in this embodiment of the present disclosure may be configured to implement a packet sending method. A specific implementation manner is shown in FIG. 3. The service server provided in this embodiment includes:

an obtaining module 31, configured to obtain a certificate that is related to a directional-traffic-based charging service for which a service provider applies, where the certificate is pushed by a certificate push server;

a generation module 32, configured to generate a feature field based on the certificate; and a sending module 33, configured to send, to a node, a service packet including the feature field, so that after verifying that the feature field is valid, the node calculates an amount of traffic used in a process in which the service server supports user equipment in using a service provided by the service provider, and reports the amount of traffic to a charging server, and the charging server performs directional-traffic-based charging on the service provider according to the amount of traffic.

In this embodiment of the present disclosure, the user equipment may be a device that can implement network access, such as UE (User Equipment), an MS (Mobile Station), a mobile terminal, or a computer. The node device may be a GGSN (Gateway GPRS Support Node), a DPI (Deep Packet Inspection) device, a PDG (Packet Data Gateway), or the like. This is not limited herein. The node device is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

Optionally, the service server in this embodiment of the present disclosure is further configured to obtain the certificate from the certificate push server.

The sending module 33 is further configured to send a registration request to the certificate push server.

The obtaining module 31 is configured to receive a registration response sent by the certificate push server. The registration response carries the certificate, and the certificate is issued by a certificate issuance server for the directional-traffic-based charging service for which the service provider applies, and is delivered by the certificate issuance server to the certificate push server.

The certificate issuance server mentioned in this embodiment of the present disclosure is an operator. The certificate issuance server is configured to issue the certificate for the directional-traffic-based charging service for which the service provider applies. The certificate issuance server may be a CA (Certificate Authority) server. The certificate issued by the certificate issuance server is a character string in a specific format, and the certificate may include data such as a certificate version number, a certificate service name, a certificate validity period, an encryption/decryption algorithm, and a key.

Further, optionally, the feature field that is used for verification and that is generated by the service server in this embodiment of the present disclosure is generated according to the foregoing obtained certificate. A step of generating the feature field by the generation module 32 may specifically include: obtaining a validity period from the certificate; determining, according to the validity period, whether the certificate is currently valid; when determining that the certificate is currently valid, generating a packet digest based on content of the service packet; obtaining a certificate version number and a certificate service name from the certificate; and generating the feature field by encrypting the certificate version number, the certificate service name, and the packet digest according to a key and an encryption algorithm that are provided by the certificate.

Specifically, an algorithm for the packet digest may include a CRC (Cyclic Redundancy Check) algorithm, an MD (Message Digest) algorithm, an SHA (Secure Hash Algorithm), and the like. Correspondingly, the packet digest may be a CRC code, an MD code, an SHA code, or the like.

Further, optionally, the service server obtains, from an algorithm database by using the algorithm database received from the certificate issuance server and according to the encryption algorithm required in the certificate, an encryption function that needs to be used, to perform encryption calculation. That is, the service server obtains the algorithm database; and encrypts the certificate version number, the certificate service name, and the packet digest with reference to the key according to a function that is used for supporting the encryption algorithm and that is provided by the algorithm database, to generate the feature field.

After generating the feature field, the service server may write the feature field into the packet. For a location, refer to Table 2.

In addition, when determining that the validity period obtained from the certificate expires, the service server cannot send the service packet by using the certificate. In this case, the service provider needs to renew a subscription to or reapply for the directional-traffic-based charging service, and regain a certificate.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

Further, optionally, the service server may embed the algorithm database in an APP provided by the service server, so that the user equipment can obtain, from the algorithm database according to the algorithm database provided by the APP and according to the encryption algorithm required in the certificate, the encryption function that needs to be used, to perform encryption calculation.

When the service server in this embodiment of the present disclosure needs to send a service packet to user equipment by using a node device, the service server generates a feature field in real time according to content of a certificate and content of the sent packet, and then adds the feature field to the service packet, so that after verifying that the feature field is valid, the node device calculates an amount of traffic used by the service server, and reports the amount of traffic to a charging server, and the charging server performs directional-traffic-based charging on a service provider according to the amount of traffic. The service packet sent by the service server in this embodiment of the present disclosure uses the feature field that is generated based on the certificate. Therefore, an effect of a dynamic packet feature can be achieved, a fraud behavior can be better detected by the node device, the service packet can be better verified by the node device, and accuracy of performing directional-traffic statistics collection on the service provider by the node device is improved.

Figure 4:
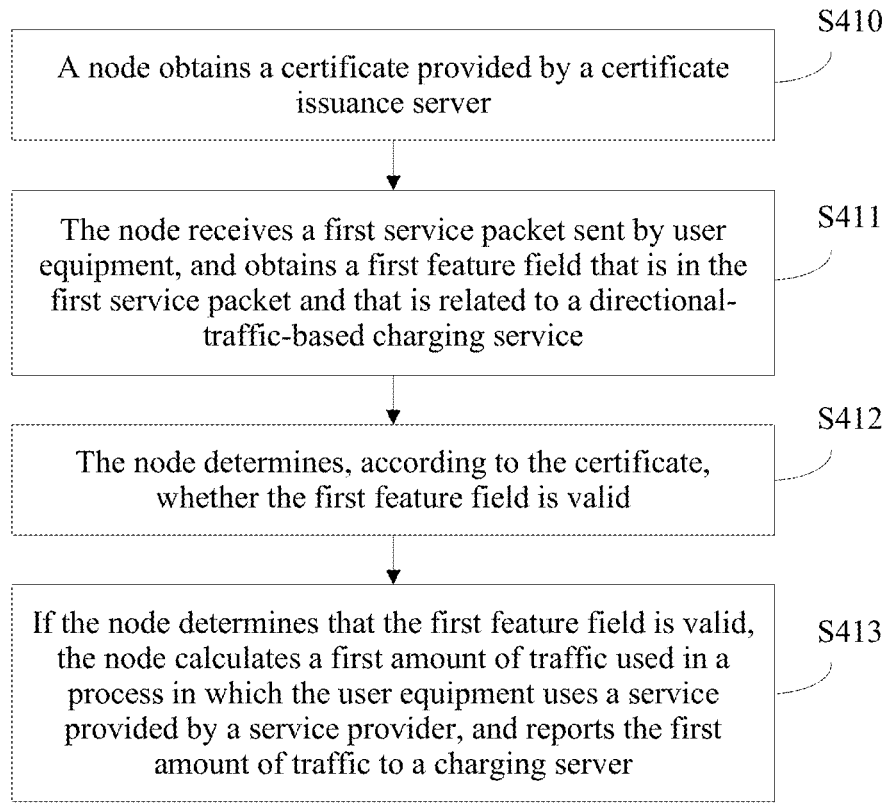
FIG. 4 is a schematic flowchart of a directional-traffic statistics collection method according to an embodiment of the present disclosure.

Referring to FIG. 4, FIG. 4 is a flowchart of a directional-traffic statistics collection method according to an embodiment of the present disclosure. This embodiment may be executed by any node device described in FIG. 1a, FIG. 1b, or FIG. 1c. Aprocedure in this embodiment may specifically include the following steps:

Step S410: The node obtains a certificate provided by a certificate issuance server.

Step S411: The node receives a first service packet sent by user equipment, and obtains a first feature field that is in the first service packet and that is related to a directional-traffic-based charging service.

Step S412: Determine, according to the certificate, whether the first feature field is valid.

Step S413: If the node determines that the first feature field is valid, the node calculates a first amount of traffic used in a process in which the user equipment uses a service provided by a service provider, and reports the first amount of traffic to a charging server, so that the charging server performs directional-traffic-based charging on the service provider according to the first amount of traffic.

In this embodiment of the present disclosure, the user equipment may be a device that can implement network access, such as UE (User Equipment), an MS (Mobile Station), a mobile terminal, or a computer. The node may be a GGSN (Gateway GPRS Support Node), a DPI (Deep Packet Inspection) device, a PDG (Packet Data Gateway), or the like. This is not limited herein. The node is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

Optionally, before step S410, the node in this embodiment of the present disclosure further needs to receive and store the certificate sent by the certificate issuance server for the directional-traffic-based charging service for which the service provider applies. The certificate issuance server mentioned in this embodiment of the present disclosure is an operator. The certificate issuance server is configured to issue the certificate for the directional-traffic-based charging service for which the service provider applies. The certificate issuance server may be a CA (Certificate Authority) server. The certificate issued by the certificate issuance server is a character string in a specific format, and the certificate may include data such as a certificate version number, a certificate service name, a certificate validity period, an encryption/decryption algorithm, and a key.

Further, optionally, the first service packet received by the node may be sent by the user equipment by using an APP (Application) downloaded by the user equipment. The first service packet is supposed to be forwarded by the node to a service server that is configured to support the service, and may be in the format shown in Table 1. The APP may be released by the service server to an application platform. After the service provider applies for the directional-traffic-based charging service and obtains the corresponding certificate by using the certificate issuance server, the certificate issuance server that issues the certificate may send the certificate to the node, so that the node checks the first service packet that is used for a service of the APP.

In an optional implementation manner, after receiving the first service packet, the node needs to determine whether the first service packet is valid. Specific implementation of determining whether the first service packet is valid may be: the node determines that the certificate is a valid certificate; the node decrypts the first feature field according to a key and a decryption algorithm that are provided by the certificate; the node determines whether data obtained by decrypting the first feature field is consistent with content provided by the certificate and content of the first service packet; and if determining that the data obtained by decrypting the first feature field is consistent with the content provided by the certificate and the content of the first service packet, the node determines that the first feature field is valid.

In an optional implementation manner, the first feature field in the foregoing received first service packet may include encryption information of a certificate version number, encryption information of a certificate service name, and encryption information of a first packet digest. The first service packet is generated by the user equipment according to the certificate issued by the certificate issuance server. Both the certificate version number and the certificate service name that are included in the first feature field are provided by the certificate. A manner of generating the first packet digest is specified by the certificate. In addition, an encryption algorithm and a key that are involved in a process of generating the first feature field by encrypting the certificate version number, the certificate service name, and the first packet digest are provided by the certificate. Correspondingly, specific implementation in which the node determines whether the data obtained by decrypting the first feature field is consistent with the content provided by the certificate and the content of the first service packet may be: the node determines whether the certificate version number and the certificate service name are consistent with a certificate version number and a certificate service name that are included in the certificate; the node determines whether the first packet digest is consistent with the content of the first service packet; and if the node determines that the certificate version number and the certificate service name are consistent with the certificate version number and the certificate service name that are included in the certificate and determines that the first packet digest is consistent with the content of the first service packet, the node determines that the first feature field is valid.

Specifically, an algorithm for the first packet digest may include a CRC (Cyclic Redundancy Check) algorithm, an MD (Message Digest) algorithm, an SHA (Secure Hash Algorithm), and the like. Correspondingly, the first packet digest may be a CRC code, an MD code, an SHA code, or the like.

Optionally, the node may further receive an algorithm database sent by the certificate issuance server. The algorithm database is used to provide a function for supporting the encryption/decryption algorithm. The node may find a corresponding calculation function from the algorithm database according to an algorithm specified in the certificate, to decrypt the first feature field with reference to the key.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

In addition, when the node determines that a validity period obtained from the certificate expires, the node does not further determine validity of the first feature field in the first service packet, and may inform the service server that the validity period of the certificate expires. In this case, the service provider needs to renew a subscription to or reapply for the directional-traffic-based charging service, and regain a certificate.

Further, optionally, when the node determines that the first feature field in the first service packet is invalid, it is considered that the user equipment that sends the first service packet has a fraud behavior, and the node does not forward the first service packet to the service server and terminates an access behavior of the user equipment; or continues to forward the first service packet to the service server, but reports, to the charging server that is configured to charge the user equipment, the first amount of traffic that is obtained through statistics collection, and instructs the charging server to perform charging by using a charging policy of double punishment.

Optionally, the node device in this embodiment of the present disclosure is further configured to receive a second service packet from the service server to determine whether the service server has a fraud behavior. That is, the node device receives the second service packet sent by the service server; parses the second service packet to obtain a second feature field that is in the second service packet and that is related to the directional-traffic-based charging service; and determines, according to the certificate, whether the second feature field is valid. The node device is further configured to: when determining that the second feature field is valid, calculate a second amount of traffic used in a process in which the service server supports the user equipment in using the service provided by the service provider, and report the second amount of traffic to the charging server, so that the charging server performs directional-traffic-based charging on the service provider according to the second amount of traffic.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

In this embodiment of the present disclosure, after receiving a service packet of user equipment, a node determines, by detecting whether a feature field in the service packet is valid, whether to report, to a charging server that is configured to perform directional-traffic-based charging on a service provider, an amount of traffic used in a process in which the user equipment uses a service provided by the service provider. Therefore, a fraud behavior can be effectively avoided. According to the method in this embodiment of the present disclosure, a fraud risk such as fraudulently using a packet feature is avoided, and accuracy of performing directional-traffic statistics collection on a service provider is improved.

Figure 5:
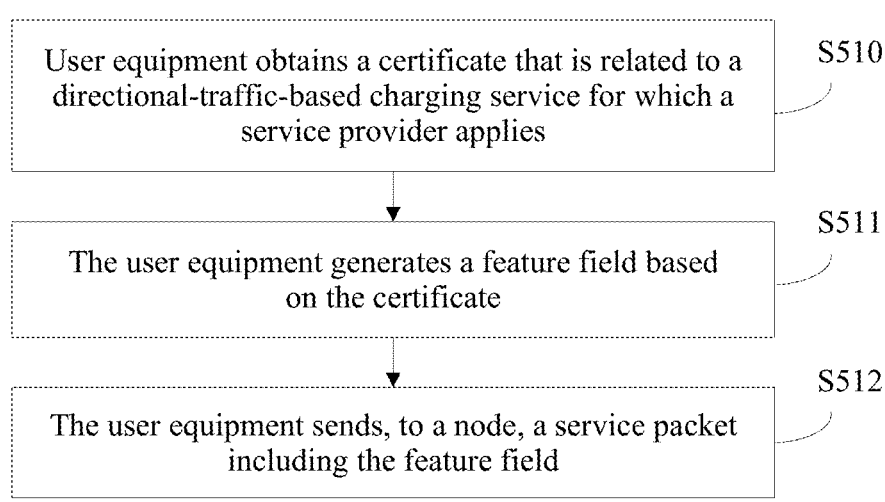
FIG. 5 is a schematic flowchart of a service packet sending method according to an embodiment of the present disclosure.

Referring to FIG. 5, FIG. 5 is a flowchart of a service packet sending method according to an embodiment of the present disclosure. This embodiment may be executed by any user equipment described in FIG. 2a, FIG. 2b, FIG. 2c, FIG. 2d, or FIG. 2e. A procedure in this embodiment may specifically include the following steps:

Step S510: The user equipment obtains a certificate that is related to a directional-traffic-based charging service for which a service provider applies.

Step S511: The user equipment generates a feature field based on the certificate.

Step S512: The user equipment sends, to a node, a service packet including the feature field, so that after verifying that the feature field is valid, the node calculates an amount of traffic used in a process in which the user equipment uses a service provided by the service provider, and reports the amount of traffic to a charging server, and the charging server performs directional-traffic-based charging on the service provider according to the amount of traffic.

In this embodiment of the present disclosure, the user equipment may be a device that can implement network access, such as UE (User Equipment), an MS (Mobile Station), a mobile terminal, or a computer. The node device may be a GGSN (Gateway GPRS Support Node), a DPI (Deep Packet Inspection) device, a PDG (Packet Data Gateway), or the like. This is not limited herein. The node device is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

Further, optionally, before obtaining the certificate that is related to the directional-traffic-based charging service for which the service provider applies, the user equipment in this embodiment of the present disclosure is configured to obtain the certificate from a certificate push server. That is, the user equipment sends a registration request to the certificate push server; and the user equipment receives a registration response sent by the certificate push server. The registration response carries the certificate, and the certificate is issued by a certificate issuance server for the directional-traffic-based charging service for which the service provider applies, and is delivered by the certificate issuance server to the certificate push server.

The certificate issuance server mentioned in this embodiment of the present disclosure is an operator. The certificate issuance server is configured to issue the certificate for the directional-traffic-based charging service for which the service provider applies. The certificate issuance server may be a CA (Certificate Authority) server. The certificate issued by the certificate issuance server is a character string in a specific format, and the certificate may include data such as a certificate version number, a certificate service name, a certificate validity period, an encryption/decryption algorithm, and a key.

Further, optionally, when generating the service packet by using an APP downloaded by the user equipment, the user equipment in this embodiment of the present disclosure needs to generate the feature field used for verification. The feature field is generated according to the foregoing obtained certificate. A specific implementation manner in which the user equipment generates the feature field based on the certificate may be: the user equipment generates a packet digest based on content of the service packet; the user equipment determines that the certificate is a valid certificate; and the user equipment generates the feature field according to the packet digest and content provided by the certificate.

Further, optionally, a specific implementation manner in which the user equipment in this embodiment of the present disclosure generates the feature field according to the packet digest and the content provided by the certificate may be: the user equipment obtains a certificate version number and a certificate service name from the certificate; and the user equipment generates the feature field by encrypting the certificate version number, the certificate service name, and the packet digest according to a key and an encryption algorithm that are provided by the certificate.

Specifically, an algorithm for the packet digest may include a CRC (Cyclic Redundancy Check) algorithm, an MD (Message Digest) algorithm, an SHA (Secure Hash Algorithm), and the like. Correspondingly, the packet digest may be a CRC code, an MD code, an SHA code, or the like.

Further, optionally, a service server may embed an algorithm database in an APP provided by the service server. Therefore, the user equipment may obtain, from the algorithm database according to the algorithm database provided by the APP and according to the encryption algorithm required in the certificate, an encryption function that needs to be used, to perform encryption calculation. Specific implementation may be: the user equipment obtains the algorithm database, where the algorithm database is obtained from service program data provided by the service provider by using the service server; and the user equipment encrypts the certificate version number, the certificate service name, and the packet digest with reference to the key according to a function that is used for supporting the encryption algorithm and that is provided by the algorithm database, to generate the feature field.

After generating the feature field, the user equipment may write the feature field into the packet. For a location, refer to Table 1.

In addition, when the user equipment determines that a validity period obtained from the certificate expires, the user equipment cannot send the service packet by using the certificate, but may report a certificate invalidity message to the service server by using the APP application program, to inform that the validity period of the certificate expires. In this case, the service provider needs to renew a subscription to or reapply for the directional-traffic-based charging service, and regain a certificate.

In the solution in this embodiment of the present disclosure, a specific process in which the user equipment receives the certificate pushed by the certificate push server needs participation of the node device. The certificate push server may send the certificate to the node device, and prompt the node device to forward the certificate to the user equipment.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

In this embodiment of the present disclosure, when user equipment needs to use a service provided by a service provider, the user equipment generates a feature field in real time according to content of a certificate and content of a sent packet, and then adds the feature field to a service packet that needs to be sent to a node device, so that after verifying that the feature field is valid, the node device calculates an amount of traffic used in a process in which the user equipment uses the service provided by the service provider, and reports the amount of traffic to a charging server, and the charging server performs directional-traffic-based charging on the service provider according to the amount of traffic. In the method in this embodiment of the present disclosure, the service packet sent by the user equipment uses the feature field that is generated based on the certificate. Therefore, an effect of a dynamic packet feature can be achieved, a fraud behavior can be better detected by the node device, the service packet can be better verified by the node device, and accuracy of performing directional-traffic statistics collection on the service provider by the node device is improved.

Figure 6:
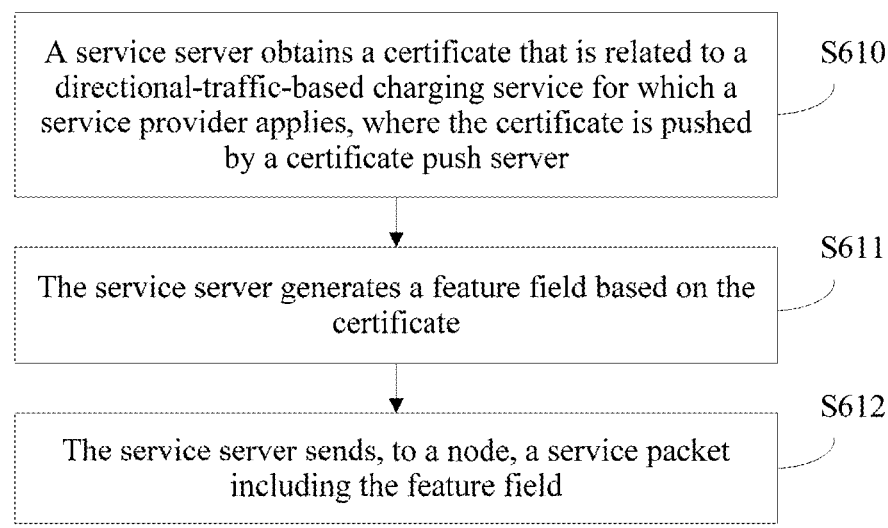
FIG. 6 is a schematic flowchart of another service packet sending method according to an embodiment of the present disclosure.

Referring to FIG. 6, FIG. 6 is a flowchart of a service packet sending method according to an embodiment of the present disclosure. This embodiment may be executed by the service server described in FIG. 3. A procedure in this embodiment may specifically include the following steps:

Step S610: The service server obtains a certificate that is related to a directional-traffic-based charging service for which a service provider applies, where the certificate is pushed by a certificate push server.

Step S611: Generate a feature field based on the certificate.

Step S612: Send, to a node, a service packet including the feature field, so that after verifying that the feature field is valid, the node calculates an amount of traffic used in a process in which the service server supports user equipment in using a service provided by the service provider, and reports the amount of traffic to a charging server, and the charging server performs directional-traffic-based charging on the service provider according to the amount of traffic.

In this embodiment of the present disclosure, the user equipment may be a device that can implement network access, such as UE (User Equipment), an MS (Mobile Station), a mobile terminal, or a computer. The node device may be a GGSN (Gateway GPRS Support Node), a DPI (Deep Packet Inspection) device, a PDG (Packet Data Gateway), or the like. This is not limited herein. The node device is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

Optionally, the service server in this embodiment of the present disclosure is further configured to obtain the certificate from the certificate push server. That is, the service server sends a registration request to the certificate push server; and receives a registration response sent by the certificate push server. The registration response carries the certificate, and the certificate is issued by a certificate issuance server for the directional-traffic-based charging service for which the service provider applies, and is delivered by the certificate issuance server to the certificate push server.

The certificate issuance server mentioned in this embodiment of the present disclosure is an operator. The certificate issuance server is configured to issue the certificate for the directional-traffic-based charging service for which the service provider applies. The certificate issuance server may be a CA (Certificate Authority) server. The certificate issued by the certificate issuance server is a character string in a specific format, and the certificate may include data such as a certificate version number, a certificate service name, a certificate validity period, an encryption/decryption algorithm, and a key.

Further, optionally, in the solution in this embodiment of the present disclosure, the feature field that is used for verification and that is generated by the service server is generated according to the foregoing obtained certificate. A step of generating the feature field by the service server may specifically include: obtaining a validity period from the certificate; determining, according to the validity period, whether the certificate is currently valid; when determining that the certificate is currently valid, generating a packet digest based on content of the service packet; obtaining a certificate version number and a certificate service name from the certificate; and generating the feature field by encrypting the certificate version number, the certificate service name, and the packet digest according to a key and an encryption algorithm that are provided by the certificate.

Specifically, an algorithm for the packet digest may include a CRC (Cyclic Redundancy Check) algorithm, an MD (Message Digest) algorithm, an SHA (Secure Hash Algorithm), and the like. Correspondingly, the packet digest may be a CRC code, an MD code, an SHA code, or the like.

Further, optionally, the service server obtains, from an algorithm database by using the algorithm database received from the certificate issuance server and according to the encryption algorithm required in the certificate, an encryption function that needs to be used, to perform encryption calculation. That is, the service server obtains the algorithm database; and encrypts the certificate version number, the certificate service name, and the packet digest with reference to the key according to a function that is used for supporting the encryption algorithm and that is provided by the algorithm database, to generate the feature field.

After generating the feature field, the service server may write the feature field into the packet. For a location, refer to Table 2.

In addition, when determining that the validity period obtained from the certificate expires, the service server cannot send the service packet by using the certificate. In this case, the service provider needs to renew a subscription to or reapply for the directional-traffic-based charging service, and regain a certificate.

In the solution in this embodiment of the present disclosure, the algorithm database may be an algorithm authentication API (Application Programming Interface) library, and includes multiple programs used for calculation. The user equipment and the node device each may perform calculation by invoking the programs in the algorithm database by using ports for connecting the user equipment and the node device to the algorithm database.

Further, optionally, the service server may embed the algorithm database in an APP provided by the service server, so that the user equipment can obtain, from the algorithm database according to the algorithm database provided by the APP and according to the encryption algorithm required in the certificate, the encryption function that needs to be used, to perform encryption calculation.

In the method in this embodiment of the present disclosure, when a service server needs to send a service packet to user equipment by using a node device, the service server generates a feature field in real time according to content of a certificate and content of the sent packet, and then adds the feature field to the service packet, so that after verifying that the feature field is valid, the node device calculates an amount of traffic used by the service server, and reports the amount of traffic to a charging server, and the charging server performs directional-traffic-based charging on a service provider according to the amount of traffic. In the method in this embodiment of the present disclosure, the service packet sent by the service server uses the feature field that is generated based on the certificate. Therefore, an effect of a dynamic packet feature can be achieved, a fraud behavior can be better detected by the node device, the service packet can be better verified by the node device, and accuracy of performing directional-traffic statistics collection on the service provider by the node device is improved.

Figure 7:
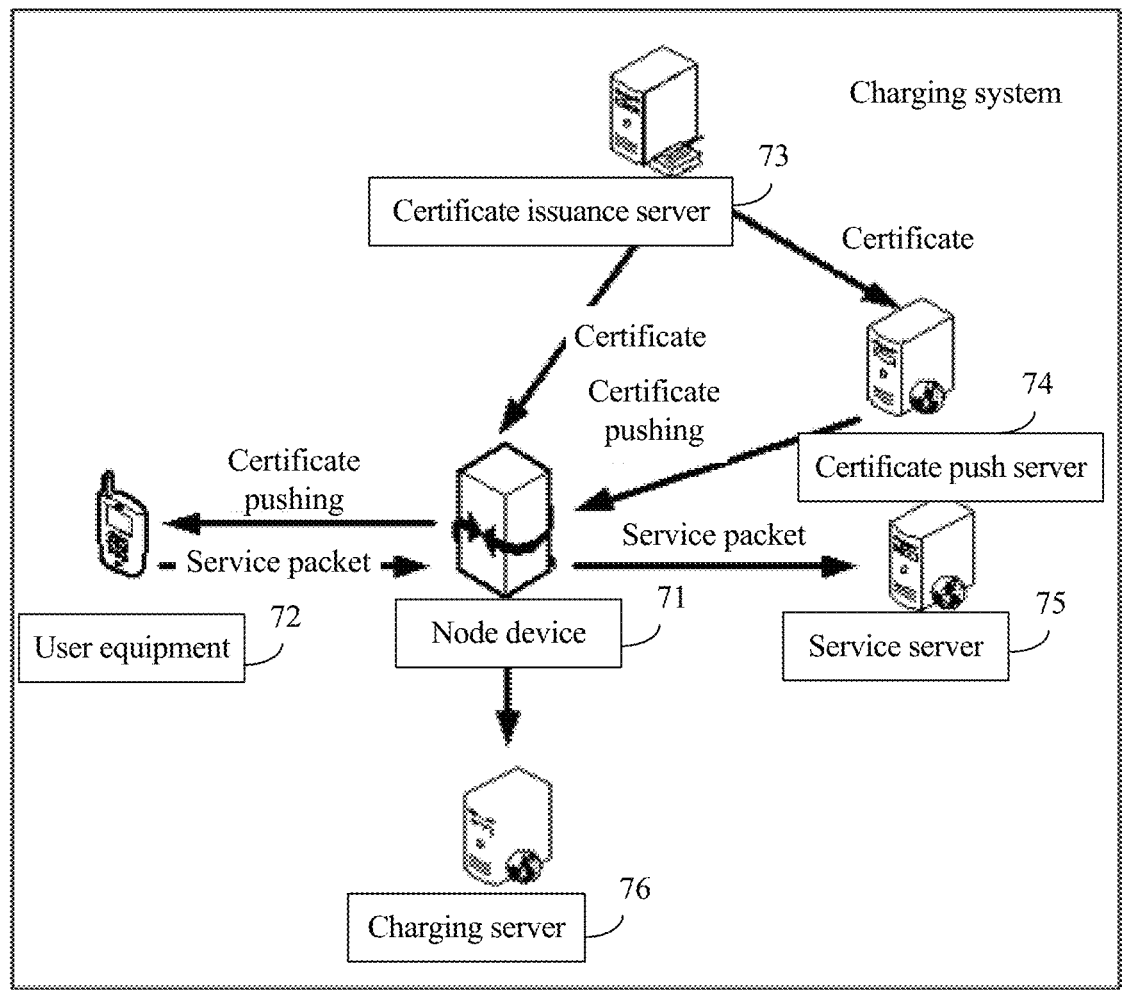
FIG. 7 is a schematic diagram of structural composition of a charging system according to an embodiment of the present disclosure.

Referring to a charging system shown in FIG. 7, the charging system may include user equipment 72, a node device 71, a certificate issuance server 73, a certificate push server 74, a service server 75, and a charging server 76.

The node device 71 is configured to: obtain a certificate provided by the certificate issuance server; receive a first service packet sent by the user equipment; obtain a first feature field that is in the first service packet and that is related to a directional-traffic-based charging service; and when determining that the first feature field is valid, calculate a first amount of traffic used in a process in which the user equipment uses a service provided by a service provider, and report the first amount of traffic to the charging server, so that the charging server performs directional-traffic-based charging on the service provider according to the first amount of traffic.

The user equipment 72 is configured to: obtain the certificate that is related to the directional-traffic-based charging service for which the service provider applies; generate the first feature field based on the certificate; and send, to the node, the first service packet including the first feature field, so that after verifying that the first feature field is valid, the node calculates the first amount of traffic used in the process in which the user equipment uses the service provided by the service provider, and reports the first amount of traffic to the charging server, and the charging server performs directional-traffic-based charging on the service provider according to the first amount of traffic.

The certificate issuance server 73 is configured to: issue the certificate according to the directional-traffic-based charging service for which the service provider applies for the service provider, and send the certificate to the certificate push server and the node device; and send an algorithm database to the node device and the service server.

The certificate push server 74 is configured to: receive the certificate sent by the certificate issuance server; receive a registration request sent by the user equipment; and send, to the user equipment in response to the registration request, a registration response carrying the certificate.

The service server 75 is configured to: obtain the certificate that is related to the directional-traffic-based charging service for which the service provider applies; generate a feature field based on the certificate; send, to the node, a service packet including the feature field; receive the algorithm database; and set the algorithm database into service program data provided by the service provider.

The charging server 76 is configured to: receive the first amount, sent by the node device, of traffic used in the process in which the user equipment uses the service provided by the service provider; and perform directional-traffic-based charging on the service provider according to the first amount of traffic.

In this embodiment of the present disclosure, the user equipment 72 may be a device that can implement network access, such as UE (User Equipment), an MS (Mobile Station), a mobile terminal, or a computer. The node device 71 may be a GGSN (Gateway GPRS Support Node), a DPI (Deep Packet Inspection) device, a PDG (Packet Data Gateway), or the like. This is not limited herein. The node is configured to: perform application-layer-based traffic detection and control detection on a network access behavior of a client, analyze network access traffic of the client, perform a charging function according to a specific policy, and correspondingly report the traffic to the charging server, so that the charging server accurately performs charging.

Optionally, the node device 71 in this embodiment of the present disclosure is further configured to receive and store the certificate sent by the certificate issuance server for the directional-traffic-based charging service for which the service provider applies. The certificate issuance server 73 mentioned in this embodiment of the present disclosure is an operator. The certificate issuance server 73 is configured to issue the certificate for the directional-traffic-based charging service for which the service provider applies. The certificate issuance server 73 may be a CA (Certificate Authority) server. The certificate issued by the certificate issuance server 73 is a character string in a specific format, and the certificate may include data such as a certificate version number, a certificate service name, a certificate validity period, an encryption/decryption algorithm, and a key.

Further, optionally, the user equipment 72 may send the first service packet by using an APP (Application) downloaded by the user equipment 72. The first service packet is supposed to be forwarded by the node device 71 to the service server that is configured to support the service, and may be in the format shown in Table 1. The APP may be released by the service server 75 to an application platform. After the service provider applies for the directional-traffic-based charging service and obtains the corresponding certificate by using the certificate issuance server 73, the certificate issuance server 73 that issues the certificate may send the certificate to the node device 71, so that the node checks the first service packet that is used for a service of the APP.

In an optional implementation manner, the first feature field in the first service packet generated by the user equipment 72 may include encryption information of a certificate version number, encryption information of a certificate service name, and encryption information of a first packet digest. The first service packet is generated by the user equipment 72 according to the certificate issued by the certificate issuance server 73. Both the certificate version number and the certificate service name that are included in the first feature field are provided by the certificate. A manner of generating the first packet digest is specified by the certificate. In addition, an encryption algorithm and a key that are involved in a process of generating the first feature field by encrypting the certificate version number, the certificate service name, and the first packet digest are provided by the certificate. Correspondingly, specific implementation in which the node device 71 determines, according to the certificate provided by the certificate issuance server 73, whether the first feature field is valid may be: the node device 71 obtains the certificate, obtains a validity period from the certificate, and determines, according to the validity period, whether the certificate is currently valid; if determining that the certificate is currently valid, the node device 71 decrypts the first feature field according to a key and a decryption algorithm that are provided by the certificate, to obtain the certificate version number, the certificate service name, and the first packet digest that are included in the first feature field; the node device 71 determines whether the obtained certificate version number and the obtained certificate service name are consistent with a certificate version number and a certificate service name that are included in the certificate; if the node device 71 determines that the obtained certificate version number and the obtained certificate service name are consistent with the certificate version number and the certificate service name that are included in the certificate, the node device 71 determines whether the obtained first packet digest is consistent with content of the first service packet; and if determining that the obtained first packet digest is consistent with the content of the first service packet, the node device 71 determines that the first feature field is valid.

Specifically, an algorithm, specified in the certificate, for the packet digest may include a CRC (Cyclic Redundancy Check) algorithm, an MD (Message Digest) algorithm, an SHA (Secure hash algorithm), and the like. Correspondingly, the packet digest may be a CRC code, an MD code, an SHA code, or the like.

Optionally, the node device 71 may further receive the algorithm database sent by the certificate issuance server 73. The algorithm database is used to provide a function for supporting the encryption/decryption algorithm. The node device 71 may find a corresponding calculation function from the algorithm database according to an algorithm specified in the certificate, to decrypt the first feature field with reference to the key.

In addition, when the node device 71 determines that the validity period obtained from the certificate expires, the node device 71 does not further determine validity of the first feature field in the first service packet, and may inform the service server 75 that the validity period of the certificate expires. In this case, the service provider needs to renew a subscription to or reapply for the directional-traffic-based charging service, and regain a certificate. When the user equipment 72 determines that the validity period obtained from the certificate expires, the user equipment 72 cannot send the first service packet by using the certificate, but may report a certificate invalidity message to the service server 75 by using the APP application program, to inform that the validity period of the certificate expires. In this case, the service provider needs to renew a subscription to or reapply for the directional-traffic-based charging service, and regain a certificate.

In the solution in this embodiment of the present disclosure, a specific process in which the user equipment 72 receives the certificate pushed by the certificate push server 74 needs participation of the node device 71. The certificate push server 74 may send the certificate to the node device 71, and prompt the node device 71 to forward the certificate to the user equipment 72.

Further, optionally, when the node device 71 determines that the first feature field in the first service packet is invalid, it is considered that the user equipment 72 that sends the first service packet has a fraud behavior, and the node device 71 does not forward the first service packet to the service server 75 and terminates an access behavior of the user equipment 72; or continues to forward the first service packet to the service server 75, but reports, to the charging server 76 that is configured to charge the user equipment 72, the first amount of traffic that is obtained through statistics collection, and instructs the charging server 76 to perform charging by using a charging policy of double punishment.

In an optional implementation manner, the service server 75 may further send a second service packet to the user equipment 72 by using the node device 71. The second service packet may be in a form of the first service packet. A second feature field included in the second service packet may include encryption information of a certificate version number, encryption information of a certificate service name, and encryption information of a second packet digest. The second service packet is generated by the user equipment 72 according to the certificate issued by the certificate issuance server 73. Both the certificate version number and the certificate service name that are included in the second feature field are provided by the certificate. A manner of generating the second packet digest is specified by the certificate. In addition, an encryption algorithm and a key that are involved in a process of generating the second feature field by encrypting the certificate version number, the certificate service name, and the second packet digest are provided by the certificate. Correspondingly, the node device 71 may determine whether the second feature field is valid and verify whether the service server 75 has a fraud behavior, according to the certificate provided by the certificate issuance server 73.

In the solution in this embodiment of the present disclosure, the algorithm database may be an algorithm authentication API (Application Programming Interface) library, and includes multiple programs used for calculation. The node device 71, the user equipment 72, and the service server 75 each may perform calculation by invoking the programs in the algorithm database by using ports for connecting the node device 71, the user equipment 72, and the service server 75 to the algorithm database.

In the charging system provided in this embodiment of the present disclosure, a certificate issuance server provides a certificate that is used to improve accuracy of directional-traffic statistics collection, and the certificate is delivered by the certificate issuance server to both a node device and a certificate push server. After receiving a first service packet of user equipment, the node device determines, by detecting whether a first feature field in the first service packet is valid, whether to report, to a charging server that is configured to perform directional-traffic-based charging on a service provider, a first amount of traffic used in a process in which the user equipment uses a service provided by the service provider. Therefore, a fraud behavior can be effectively avoided. The user equipment generates, according to content of the certificate and content of the sent packet, in real time a packet including the first feature field. Therefore, an effect of a dynamic packet feature can be achieved, and a fraud behavior can be better detected by the node device. When finding a fraud behavior or a certificate expiration case, the certificate issuance server re-issues a certificate according to a requirement of the service provider, so as to improve accuracy of performing directional-traffic statistics collection on the service provider. In addition, in the system in this embodiment of the present disclosure, the node device may further detect, by using a same method, a second service packet sent by a service server. Therefore, according to the charging system in this embodiment of the present disclosure, a fraud risk in the prior art such as fraudulently using a packet feature is avoided, and accuracy of performing directional-traffic statistics collection on a service provider is improved.

Figure 8:
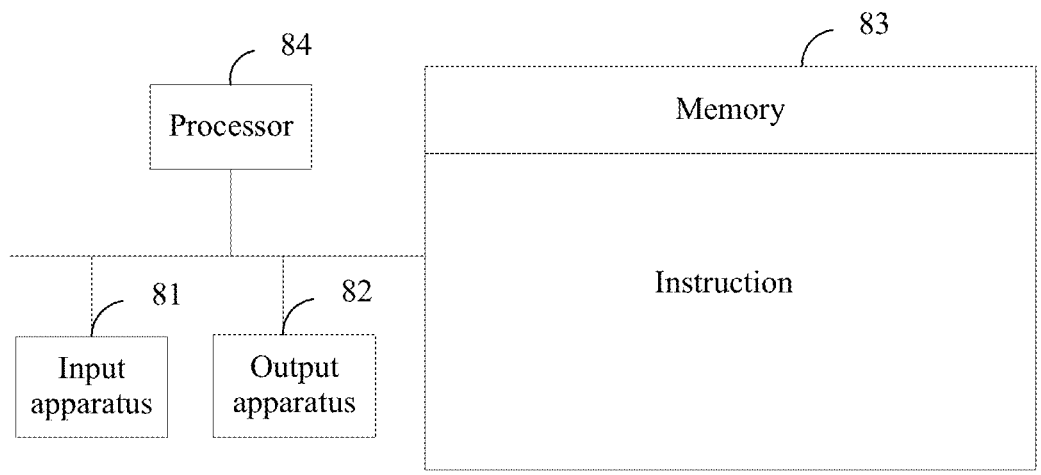
FIG. 8 is a schematic diagram of structural composition of another node device according to an embodiment of the present disclosure.

Referring to FIG. 8, FIG. 8 is a structural diagram of another node device according to an embodiment of the present disclosure. The node device provided in this embodiment is corresponding to the directional-traffic statistics collection method shown in FIG. 4, and is an entity for executing the directional-traffic statistics collection method shown in FIG. 4. A specific implementation manner is shown in FIG. 8. The node device provided in this embodiment includes an input apparatus 81, an output apparatus 82, a memory 83, and a processor 84. The memory 83 stores a group of program code, and the processor 84 is configured to invoke the program code stored in the memory 83, so as to perform the following operations.

The processor 84 is configured to obtain a certificate provided by a certificate issuance server.

The input apparatus 81 is configured to: receive a first service packet sent by user equipment, and obtain a first feature field that is in the first service packet and that is related to a directional-traffic-based charging service.

The processor 84 is further configured to determine, according to the certificate, whether the first feature field is valid.

The processor 84 is further configured to: when determining that the first feature field is valid, calculate a first amount of traffic used in a process in which the user equipment uses a service provided by a service provider, and report the first amount of traffic to a charging server.

Optionally, before the processor 84 performs the step of obtaining a certificate provided by a certificate issuance server, the output apparatus 82 is further configured to receive the certificate sent by the certificate issuance server for the directional-traffic-based charging service for which the service provider applies.

The memory 83 is further configured to store the certificate.

Further, optionally, specific implementation in which the processor 84 performs the step of determining, according to the certificate, whether the first feature field is valid may include:

determining that the certificate is a valid certificate;

decrypting the first feature field according to a key and a decryption algorithm that are provided by the certificate;

determining whether data obtained by decrypting the first feature field is consistent with content provided by the certificate and content of the first service packet; and if determining that the data obtained by decrypting the first feature field is consistent with the content provided by the certificate and the content of the first service packet, determining that the first feature field is valid.

Further, optionally, the data obtained by decrypting the first feature field includes a certificate version number, a certificate service name, and a first packet digest. Specific implementation in which the processor 84 performs the step of determining whether data obtained by decrypting the first feature field is consistent with content provided by the certificate and content of the first service packet may include:

determining whether the certificate version number and the certificate service name are consistent with a certificate version number and a certificate service name that are included in the certificate;

determining whether the first packet digest is consistent with the content of the first service packet; and if determining that the certificate version number and the certificate service name are consistent with the certificate version number and the certificate service name that are included in the certificate and determining that the first packet digest is consistent with the content of the first service packet, determining that the first feature field is valid.

Optionally, before the processor 84 performs the step of obtaining a certificate provided by a certificate issuance server, the input apparatus 81 is further configured to receive an algorithm database sent by the certificate issuance server.

Specific implementation in which the processor 84 performs the step of decrypting the first feature field according to a key and a decryption algorithm that are provided by the certificate may include:

decrypting the first feature field with reference to the key according to a function that is used for supporting the decryption algorithm and that is provided by the algorithm database.

Optionally, after the processor 84 calculates the first amount of traffic used in the process in which the user equipment uses the service provided by the service provider, and reports the first amount of traffic to the charging server, the input apparatus 81 is further configured to receive a second service packet sent by a service server.

The processor 84 is further configured to perform the following operations:

obtaining a second feature field that is in the second service packet and that is related to the directional-traffic-based charging service;

determining, according to the certificate, whether the second feature field is valid; and if determining that the second feature field is valid, calculating a second amount of traffic used in a process in which the service server supports the user equipment in using the service provided by the service provider, and reporting the second amount of traffic to the charging server.

Figure 9:
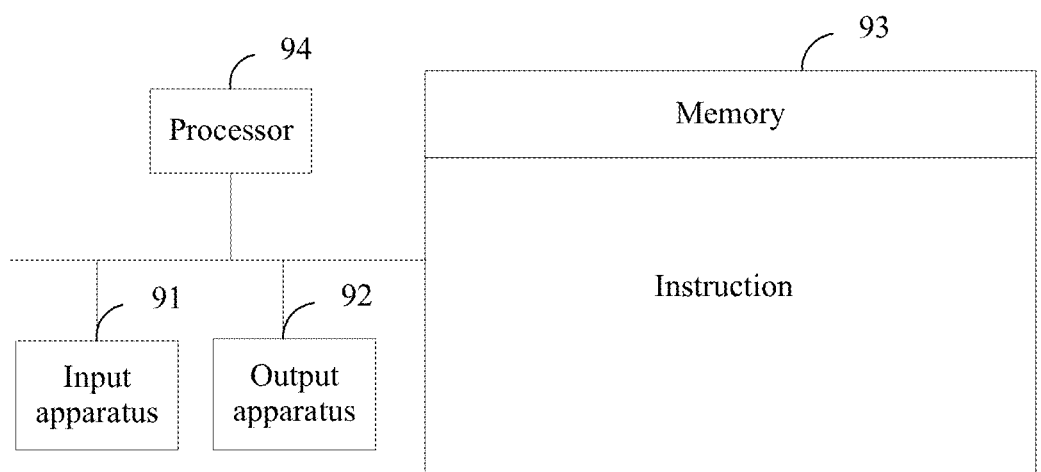
FIG. 9 is a schematic diagram of structural composition of another user equipment according to an embodiment of the present disclosure.

Referring to FIG. 9, FIG. 9 is a structural diagram of another user equipment according to an embodiment of the present disclosure. The user equipment provided in this embodiment is corresponding to the service packet sending method shown in FIG. 5, and is an entity for executing the service packet sending method shown in FIG. 5. A specific implementation manner is shown in FIG. 9. The user equipment provided in this embodiment includes an input apparatus 91, an output apparatus 92, a memory 93, and a processor 94. The memory 93 stores a group of program code, and the processor 94 is configured to invoke the program code stored in the memory 93.

The processor 94 is configured to obtain a certificate that is related to a directional-traffic-based charging service for which a service provider applies.

The processor 94 is further configured to generate a feature field based on the certificate.

The output apparatus 92 is configured to send, to a node, a service packet including the feature field, so that after verifying that the feature field is valid, the node calculates an amount of traffic used in a process of using a service provided by the service provider, and reports the amount of traffic to a charging server, and the charging server performs directional-traffic-based charging on the service provider according to the amount of traffic.

Optionally, before the processor 94 performs the step of obtaining a certificate that is related to a directional-traffic-based charging service for which a service provider applies, the output apparatus 92 is further configured to send a registration request to a certificate push server.

The input apparatus 91 is further configured to receive a registration response sent by the certificate push server. The registration response carries the certificate, and the certificate is issued by a certificate issuance server for the directional-traffic-based charging service for which the service provider applies, and is delivered by the certificate issuance server to the certificate push server.

Further, optionally, specific implementation in which the processor 94 performs the step of generating a feature field based on the certificate may include:

generating a packet digest based on content of the service packet;

determining that the certificate is a valid certificate; and generating the feature field according to the packet digest and content provided by the certificate.

Further, optionally, that the processor 94 performs the step of generating the feature field according to the packet digest and content provided by the certificate includes:

obtaining a certificate version number and a certificate service name from the certificate; and generating the feature field by encrypting the certificate version number, the certificate service name, and the packet digest according to a key and an encryption algorithm that are provided by the certificate.

Further, optionally, specific implementation in which the processor 94 performs the step of generating the feature field by encrypting the certificate version number, the certificate service name, and the packet digest according to a key and an encryption algorithm that are provided by the certificate may include:

obtaining an algorithm database, where the algorithm database is obtained from service program data provided by the service provider by using a service server; and encrypting the certificate version number, the certificate service name, and the packet digest with reference to the key according to a function that is used for supporting the encryption algorithm and that is provided by the algorithm database, to generate the feature field.

Figure 10:
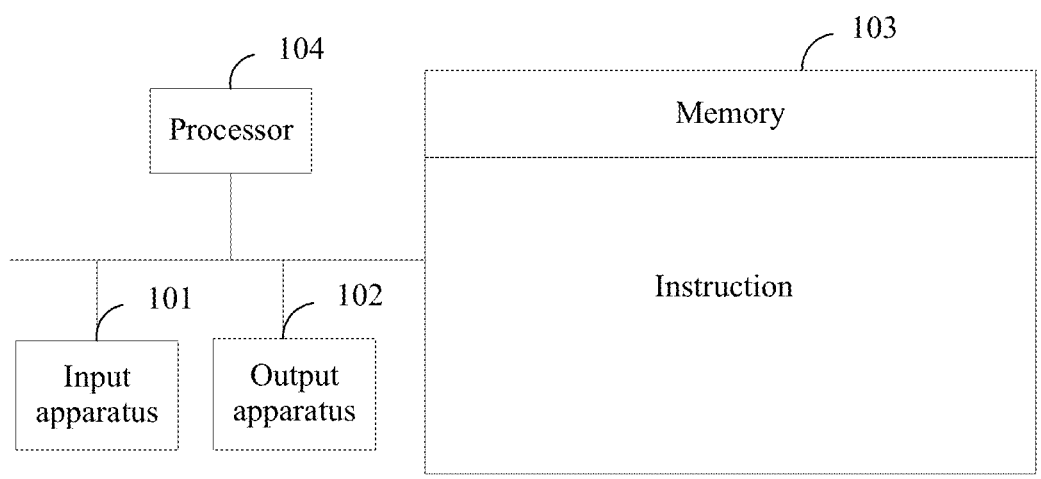
FIG. 10 is a schematic diagram of structural composition of another service server according to an embodiment of the present disclosure.

Referring to FIG. 10, FIG. 10 is a structural diagram of another service server according to an embodiment of the present disclosure. The service server provided in this embodiment is corresponding to the service packet sending method shown in FIG. 6, and is an entity for executing the service packet sending method shown in FIG. 6. A specific implementation manner is shown in FIG. 10. The service server provided in this embodiment includes an input apparatus 101, an output apparatus 102, a memory 103, and a processor 104. The memory 103 stores a group of program code, and the processor 104 is configured to invoke the program code stored in the memory 103, so as to perform the following operations:

obtaining a certificate that is related to a directional-traffic-based charging service for which a service provider applies, where the certificate is pushed by a certificate push server;

generating a feature field based on the certificate; and sending, to a node, a service packet including the feature field, so that after verifying that the feature field is valid, the node calculates an amount of traffic used in a process in which the service server supports user equipment in using a service provided by the service provider, and reports the amount of traffic to a charging server, and the charging server performs directional-traffic-based charging on the service provider according to the amount of traffic.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the apparatuses, modules, or units may be implemented in electronic, mechanical, or other forms.

The modules or units described as separate parts may or may not be physically separate, and parts displayed as modules or units may or may not be physical modules or units, may be located in one position, or may be distributed on a plurality of network modules or units. Apart or all of the modules or units may be selected according to actual needs to achieve the objectives of the solutions of the embodiments of the present application.

In addition, functional modules or units in the embodiments of the present application may be integrated into one processing module or unit, or each of the modules or units may exist alone physically, or two or more modules or units are integrated into one module or unit. The integrated modules or units may be implemented in a form of hardware, or may be implemented in a form of a software functional unit.

When the integrated module or unit is implemented in the form of a software functional module or unit and sold or used as an independent product, the integrated module or unit may be stored in a computer-readable storage medium. Based on such an understanding, the technical solutions of the present application essentially, or the part contributing to the prior art, or all or apart of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a ROM (Read-Only Memory), a RAM (Random Access Memory), a magnetic disk, or an optical disc.

The foregoing descriptions are merely specific embodiments of the present application, but are not intended to limit the protection scope of the present application. Any modification or replacement readily figured out by persons skilled in the art within the technical scope disclosed in the present application shall fall within the protection scope of the present application. Therefore, the protection scope of the present application shall be subject to the protection scope of the claims.

What is claimed is:

1. A method comprising:

receiving, by a node between a user equipment (UE) and a service server supporting a service provided by a service provider, a certificate from a certificate issuance server, the certificate associated with a directional-traffic-based charging service for which the service provider applies;

receiving, by the node, a first service packet sent by the UE;

obtaining, by the node, a first feature field from the first service packet that is related to the directional-traffic-based charging service;

determining, by the node, whether to report an amount of traffic to a charging server by determining, by the node according to the certificate, whether the first feature field of the first service packet is valid, the amount of traffic being used in a process in which the UE uses the service provided by the service provider; and when the node determines that the first feature field is valid:

calculating, by the node, a first amount of traffic used in the process in which the UE uses the service provided by the service provider, and reporting, by the node, the first amount of traffic to the charging server.

2. The method according to claim 1, wherein determining, by the node according to the certificate, whether the first feature field is valid comprises:

determining, by the node, that the certificate is a valid certificate;

decrypting, by the node, the first feature field according to a key and a decryption algorithm that are provided by the certificate;

determining, by the node, whether data obtained by decrypting the first feature field is consistent with content provided by the certificate and content of the first service packet; and when the data obtained by decrypting the first feature field is consistent with the content provided by the certificate and the content of the first service packet, determining, by the node, that the first feature field is valid.

3. The method according to claim 2, wherein:

the data obtained by decrypting the first feature field comprises a certificate version number, a certificate service name, and a first packet digest; and determining, by the node, whether data obtained by decrypting the first feature field is consistent with content provided by the certificate and content of the first service packet comprises:

determining, by the node, whether the certificate version number and the certificate service name are consistent with a certificate version number and a certificate service name that are comprised in the certificate, determining, by the node, whether the first packet digest is consistent with the content of the first service packet, and when the node determines that the certificate version number and the certificate service name are consistent with the certificate version number and the certificate service name that are included in the certificate and that the first packet digest is consistent with the content of the first service packet, determining, by the node, that the first feature field is valid.

4. The method according to claim 2, wherein:
before obtaining, by the node, the certificate provided by the certificate issuance server, the method further comprises:
receiving, by the node, an algorithm database sent by the certificate issuance server; and
decrypting, by the node, the first feature field according to the key and the decryption algorithm that are provided by the certificate comprises:
decrypting, by the node, the first feature field with reference to the key according to a function that is used for supporting the decryption algorithm and that is provided by the algorithm database.

5. The method according to claim 1, wherein after calculating, by the node, the first amount of traffic used in the process in which the UE uses the service provided by the service provider, and reporting, by the node, the first amount of traffic to the charging server, the method further comprises:
receiving, by the node, a second service packet sent by the service server;
obtaining, by the node, a second feature field that is in the second service packet and that is related to the directional-traffic-based charging service;
determining, by the node according to the certificate, whether the second feature field is valid;
when the node determines that the second feature field is valid, calculating, by the node, a second amount of traffic used in the process in which the service server supports the UE in using the service provided by the service provider; and
reporting, by the node, the second amount of traffic to the charging server.

6. The method according to claim 1, wherein the node comprises a Gateway GPRS Support Node (GGSN), a Deep Packet Inspection (DPI) device, or a Packet Data Gateway (PDG).

7. The method of claim 1, wherein the first service packet comprises the first feature field and a packet content, the first feature field includes information of a first packet digest, and the determining whether the first feature field is valid comprises:
decrypting, by the node, the first feature field based on the certificate to obtain the first packet digest; and
determining, by the node, whether the first packet digest is consistent with packet content.

8. A method comprising:
obtaining, by a user equipment, a certificate related to a directional-traffic-based charging service for which a service provider applies;
generating, by the user equipment, a packet digest based on content of a service packet;
determining, by the user equipment, that the certificate is a valid certificate;
obtaining, by the user equipment, a certificate version number and a certificate service name from the certificate;
generating, by the user equipment, a feature field by encrypting the certificate version number, the certificate service name, and the packet digest according to a key and an encryption algorithm that are provided by the certificate; and
sending, by the user equipment to a node, the service packet comprising the feature field.

9. The method according to claim 8, wherein before obtaining, by the user equipment, the certificate related to the directional-traffic-based charging service associated with the service provider, the method further comprises:
sending, by the user equipment, a registration request to a certificate push server; and
receiving, by the user equipment, a registration response sent by the certificate push server, wherein the registration response includes the certificate, and wherein the certificate is issued by a certificate issuance server for the directional-traffic-based charging service associated with the service provider.

10. A node device between a user equipment (UE) and a service server supporting a service provided by a service provider, comprising:
an input apparatus configured to:
receive a first service packet sent by the UE, and
obtain a first feature field from the first service packet related to a directional-traffic-based charging service;
an output apparatus;
a memory configured to store program code; and
a processor configured to invoke the program code stored in the memory which, when executed by the processor, causes the processor to:
receive a certificate from a certificate issuance server, the certificate associated with the directional-traffic-based charging service for which the service provider applies,
determine whether to report an amount of traffic to a charging server by determining, according to the certificate, whether the first feature field is valid, the amount of traffic being used in a process in which the UE uses the service provided by the service provider, and
when determining that the first feature field is valid:
calculate a first amount of traffic used in the process in which the UE uses the service provided by the service provider; and
report the first amount of traffic to the charging server.

11. The node device according to claim 10, wherein the program code stored in the memory, when executed by the processor, further causes the processor to:
determine that the certificate is a valid certificate;
decrypt the first feature field according to a key and a decryption algorithm that are provided by the certificate;
determine whether data obtained by decrypting the first feature field is consistent with content provided by the certificate and content of the first service packet; and
when the data obtained by decrypting the first feature field is consistent with the content provided by the certificate and the content of the first service packet, determine that the first feature field is valid.

12. The node device according to claim 11, wherein:
the data obtained by decrypting the first feature field comprises a certificate version number, a certificate service name, and a first packet digest; and
the program code stored in the memory, when executed by the processor, further causes the processor to:
determine whether the certificate version number and the certificate service name are consistent with a certificate version number and a certificate service name that are included in the certificate,
determine whether the first packet digest is consistent with the content of the first service packet, and when the certificate version number and the certificate service name are consistent with the certificate version number and the certificate service name that are included in the certificate and when the first packet digest is consistent with the content of the first service packet, determine that the first feature field is valid.

13. The node device according to claim 11, wherein:
prior to the processor obtaining the certificate provided by the certificate issuance server, the input apparatus is further configured to:
receive an algorithm database sent by the certificate issuance server; and
the program code stored in the memory, when executed by the processor, further causes the processor to:
decrypt the first feature field with reference to the key according to a function that is used for supporting the decryption algorithm and that is provided by the algorithm database.

14. The node device according to claim 10, wherein:
after the processor calculates the first amount of traffic used in the process in which the UE uses the service provided by the service provider, and reports the first amount of traffic to the charging server, the input apparatus is further configured to:
receive a second service packet sent by the service server; and
the program code stored in the memory, when executed by the processor, further causes the processor to:
obtain a second feature field that is in the second service packet and that is related to the directional-traffic-based charging service,
determine, according to the certificate, whether the second feature field is valid,
when the second feature field is valid, calculate a second amount of traffic used in the process in which the service server supports the UE in using the service provided by the service provider, and report the second amount of traffic to the charging server.

15. The node device according to claim 10, wherein the node device comprises a Gateway GPRS Support Node (GGSN), a Deep Packet Inspection (DPI) device, or a Packet Data Gateway (PDG).

16. A user equipment, comprising:
an input apparatus;
a memory configured to store program code;
a processor configured to invoke the program code stored in the memory which, when executed by the processor, causes the processor to:
obtain a certificate that is related to a directional-traffic-based charging service for which a service provider applies,
generate a packet digest based on content of a service packet,
determine that the certificate is a valid certificate,
obtain a certificate version number and a certificate service name from the certificate, and
generate a feature field by encrypting the certificate version number, the certificate service name, and the packet digest according to a key and an encryption algorithm that are provided by the certificate; and
an output apparatus configured to send, to a node, the service packet comprising the feature field.

17. The user equipment according to claim 16, wherein:
before the processor obtains the certificate that is related to the directional-traffic-based charging service associated with the service provider, the output apparatus is further configured to:
send a registration request to a certificate push server; and
the input apparatus is further configured to:
receive a registration response sent by the certificate push server, wherein the registration response includes the certificate, and wherein the certificate is sent and issued by a certificate issuance server for the directional-traffic-based charging service associated with the service provider.

18. A method comprising:
obtaining, by a user equipment, a certificate related to a directional-traffic-based charging service for which a service provider applies;
generating, by the user equipment, a packet digest based on content of a service packet;
determining, by the user equipment, that the certificate is a valid certificate;
obtaining, by the user equipment, a certificate version number and a certificate service name from the certificate;
obtaining, by the user equipment, an algorithm database, wherein the algorithm database is obtained from service program data provided by the service provider by using a service server; and
encrypting, by the user equipment, the certificate version number, the certificate service name, and the packet digest with reference to a key according to a function that is used for supporting an encryption algorithm and that is provided by the algorithm database to generate a feature field; and
sending, by the user equipment to a node, the service packet comprising the feature field.

19. A user equipment, comprising:
an input apparatus;
a memory configured to store program code;
a processor configured to invoke the program code stored in the memory which, when executed by the processor, causes the processor to:
obtain a certificate that is related to a directional-traffic-based charging service for which a service provider applies,
generate a packet digest based on content of a service packet,
determine that the certificate is a valid certificate,
obtain a certificate version number and a certificate service name from the certificate,
obtain an algorithm database, wherein the algorithm database is obtained from service program data provided by the service provider by using a service server, and
encrypt the certificate version number, the certificate service name, and the packet digest with reference to a key according to a function that is used for supporting an encryption algorithm and that is provided by the algorithm database to generate a feature field; and
an output apparatus configured to send, to a node, the service packet comprising the feature field.

* * * * *